US012811771B2

(12) United States Patent
Matsuoka

(10) Patent No.: US 12,811,771 B2
(45) Date of Patent: Nov. 24, 2026

(54) ENCRYPTION PROCESSING DEVICE AND METHOD

(71) Applicant: AXELL CORPORATION, Tokyo (JP)

(72) Inventor: Kotaro Matsuoka, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 389 days.

(21) Appl. No.: 18/527,207

(22) Filed: Dec. 1, 2023

(65) Prior Publication Data

US 2024/0121077 A1 Apr. 11, 2024

Related U.S. Application Data

(63) Continuation of application No. PCT/JP2022/013622, filed on Mar. 23, 2022.

(30) Foreign Application Priority Data

Jun. 21, 2021 (JP) ................................ 2021-102510

(51) Int. Cl.
*H04L 9/00* (2022.01)
*H04L 9/30* (2006.01)

(52) U.S. Cl.
CPC ............ *H04L 9/008* (2013.01); *H04L 9/3093* (2013.01)

(58) Field of Classification Search
CPC .......... H04L 9/008; H04L 9/3093; G09C 1/00
See application file for complete search history.

(56) References Cited

U.S. PATENT DOCUMENTS

2022/0150047 A1* 5/2022 Lee ......................... H04L 9/008
2022/0376890 A1* 11/2022 Eom ....................... H04L 9/008

FOREIGN PATENT DOCUMENTS

JP 2021-083038 A 5/2021
JP 2022-041863 A 3/2022
WO WO-2025122799 A1 * 6/2025 ......... G06F 9/30036

OTHER PUBLICATIONS

Chillott, I et al., "TFHE: Fast Fully Homomorphic Encryption over the Torus," *Journal of Cryptology,* 33:34-91, 2020, 62 pages.

(Continued)

*Primary Examiner* — Vu V Tran
(74) *Attorney, Agent, or Firm* — MASUVALLEY & PARTNERS; Peter Martinez

(57) ABSTRACT

An encryption processing device processes a ciphertext that has two values as a plaintext and is a ciphertext of fully homomorphic encryption that allows a logical operation without decryption. The encryption processing device executes a predetermined operation including calculating a plurality of new ciphertexts based on the ciphertexts input thereto. The encryption processing device comprising a processor which executes a process including performing a first homomorphic operation for the input ciphertext, calculating a first ciphertext having a polynomial by using a predetermined polynomial for a result of the first homomorphic operation to extract a second ciphertext having a coefficient of a plaintext polynomial of the first ciphertext, extracting a third ciphertext having another coefficient of a plaintext polynomial of the first ciphertext, and performing a homomorphic operation using the second ciphertext and the third ciphertext to calculate a fourth ciphertext.

7 Claims, 7 Drawing Sheets

(56) References Cited

OTHER PUBLICATIONS

Lei, X. et al., "Accelerating Homomorphic Full Adder Based on FHEW Using Multicore CPU and GPUs," 2019, IEEE 21st International Conference on High Performance Computing and Communications, IEEE, 2019.08.10, pp. 2508-2513, <DOI: 10.1109/HPCC/SmartCity/DSS.2019.00351>, 9 pages.

Chen, Y. et al., "Integer Arithmetic over Ciphertext and Homomorphic Data Aggregation," 2015 IEEE Conference on Communications and Network Security (CNS), IEEE, Sep. 28, 2015, pp. 628-632, <DOI: 10.1109/CNS.2015.7346877>, 8 pages.

Ducas, L et al., "FHEW: Bootstrapping Homomorphic Encryption in Less Than a Second," *Advances in Cryptology—EUROCRYPT 2015*, Springer, 2015.04.14, pp. 617-640, <DOI: 10.1007/978-3-662-46800-5_24> 27 pages.

WIPO, JPO as International Search Authority, International Search Report (with English translation) and Written Opinion mailed Jun. 7, 2022 in International Patent Application No. PCT/JP2022/013622, 11 pages.

* cited by examiner

ENCRYPTION PROCESSING DEVICE AND METHOD

CROSS-REFERENCE TO RELATED APPLICATION

This application is a continuation of and claims priority to International Application No. PCT/JP2022/013622 filed on Mar. 23, 2022, entitled Encryption Processing Device, Encryption Processing Method, and Encryption Processing Program, which claims priority to Japanese Application No. 2021-102510 filed Jun. 21, 2021, both of which are incorporated herein by reference in their entireties.

FIELD OF THE INVENTION

The embodiments discussed herein are related to an encryption processing device, an encryption processing method, and a non-transitory computer-readable recording medium.

BACKGROUND OF THE INVENTION

Homomorphic encryption is an encryption technique that can process encrypted data without decrypting the encrypted data.

Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

Additive homomorphic encryption performs only an additive operation (addition and subtraction) while a finite cyclic group is regarded as an integer. Multiplicative homomorphic encryption performs only a multiplicative operation (multiplication) while a finite cyclic group is regarded as an integer.

Since the finite cyclic group can be multiplied by an integer by repeating addition, a plaintext can be multiplied by an integer, and the plaintext can be exponentiated by repeating multiplication.

There is also known fully homomorphic encryption (FHE) that allows both an additive operation and a multiplicative operation to be performed while ciphertexts remain encrypted.

One of known fully homomorphic encryption techniques is fully homomorphic encryption based on the LWE (Learning with Errors) problem, which is configured by adding a small error to a plaintext in an encryption process to such an extent that there is no problem in decryption. Fully homomorphic encryption is not limited to LWE encryption.

In fully homomorphic encryption based on the LWE problem, an error is accumulated as an operation is performed, and therefore bootstrapping for reducing an error component while the ciphertext remains encrypted is performed before the error becomes too large to be decrypted.

The computation time of bootstrapping occupies most of the computation time included in fully homomorphic encryption. Further, the amount of computation is large in bootstrapping, because bootstrapping handles a large amount of data. Therefore, an operation of fully homomorphic encryption may not be able to obtain the result within a practical time.

A method for drastically improving this problem is TFHE (Fast Fully Homomorphic Encryption over the Torus) described in Non-Patent Literature 1.

TFHE: Fast Fully Homomorphic Encryption over the Torus. Journal of Cryptology, 33:34-91, 2020, I. Chillotti, N. Gama, M. Georgieva, and M. Izabachene (referred to as "aforementioned paper" in the following descriptions).

Homomorphic encryption includes Bit-wise type homomorphic encryption having two values as a plaintext and based on a logical operation, and Integer-wise type homomorphic encryption having an integer as a plaintext as one ciphertext. TFHE described in Non-Patent Literature 1 is the Bit-wise type.

In Bit-wise type homomorphic encryption, it is necessary to process 32 ciphertexts in order to handle, for example, a 32-bit integer because one ciphertext can only have 1 bit of information.

Addition, subtraction, multiplication, and comparison between integers are frequently used in various data processing. In a case of using a ciphertext having 1 bit of information, an operation is performed with a concept for designing a logic circuit. In addition and subtraction of 32-bit integers, one half adder and 31 full adders are used. In multiplication, full adders the number of which is near 32 squared (1024) are used.

Therefore, in order to reduce the processing time of fully homomorphic encryption and further improve the efficiency, it is necessary to enhance the speed of an operation by a full adder including bootstrapping.

SUMMARY OF THE INVENTION

According to an aspect of the embodiments, an encryption processing device processes a ciphertext that has two values as a plaintext and is a ciphertext of fully homomorphic encryption that allows a logical operation without decryption. The encryption processing device executes a predetermined operation including calculating a plurality of new ciphertexts based on the ciphertexts input thereto. The encryption processing device comprising a processor which executes a process including performing a first homomorphic operation for the input ciphertext, calculating a first ciphertext having a polynomial by using a predetermined polynomial for a result of the first homomorphic operation to extract a second ciphertext having a coefficient of a plaintext polynomial of the first ciphertext, extracting a third ciphertext having another coefficient of a plaintext polynomial of the first ciphertext, and performing a homomorphic operation using the second ciphertext and the third ciphertext to calculate a fourth ciphertext.

The objects and advantages of the invention will be realized and achieved by the elements and combinations specifically pointed out in the claims.

It is to be understood that both the foregoing general description and the following detailed description are exemplary and illustrative and are not intended to limit the invention as claimed.

DETAILED DESCRIPTION OF EMBODIMENTS

An embodiment of the present invention is described below in detail with reference to the drawings.

In the following descriptions, an alphanumeric character sandwiched by [ ] indicates that it is a vector. An alphanumeric character sandwiched by indicates that it is a set.

Further, in the present specification, a "logical operation" refers to a binary or multi-value logical operation.

An encryption processing device of the present embodiment performs an operation by a full adder by using fully homomorphic encryption. The encryption processing device of the present embodiment performs an operation by a full adder frequently used when an operation is performed by using TFHE that is fully homomorphic encryption, at faster speed.

It is known that an AND circuit unit and an XOR circuit unit that configure the full adder included in the encryption processing device respectively perform an operation for obtaining AND and an operation for obtaining XOR for encrypted data encrypted by Bit-wise type homomorphic encryption.

However, in order to achieve fully homomorphic encryption, it is necessary to perform a process of reducing an error, which is called Gate Bootstrapping to be described below, after the operation for obtaining AND or the operation for obtaining XOR. This Gate Bootstrapping takes time.

A full adder is generally configured by two half adders and an OR circuit unit performing an operation for obtaining OR, and a half adder is configured by a pair of an AND circuit unit performing an operation for obtaining AND and an XOR circuit unit performing an operation for obtaining XOR. Therefore, a full adder can be sped up by speeding up the half adder.

In the present embodiment, operations configuring the half adder (the operation for obtaining AND and the operation obtaining XOR) are integrated into one, whereby the number of times of homomorphic operations configuring the half adder is reduced, and the number of times of homomorphic operations configuring the full adder is eventually reduced.

Accordingly, the encryption processing device of the present embodiment can reduce the number of times of Gate Bootstrapping performed in the subsequent stage of each homomorphic operation, thereby speeding up the operation by the full adder.

Figure 1:
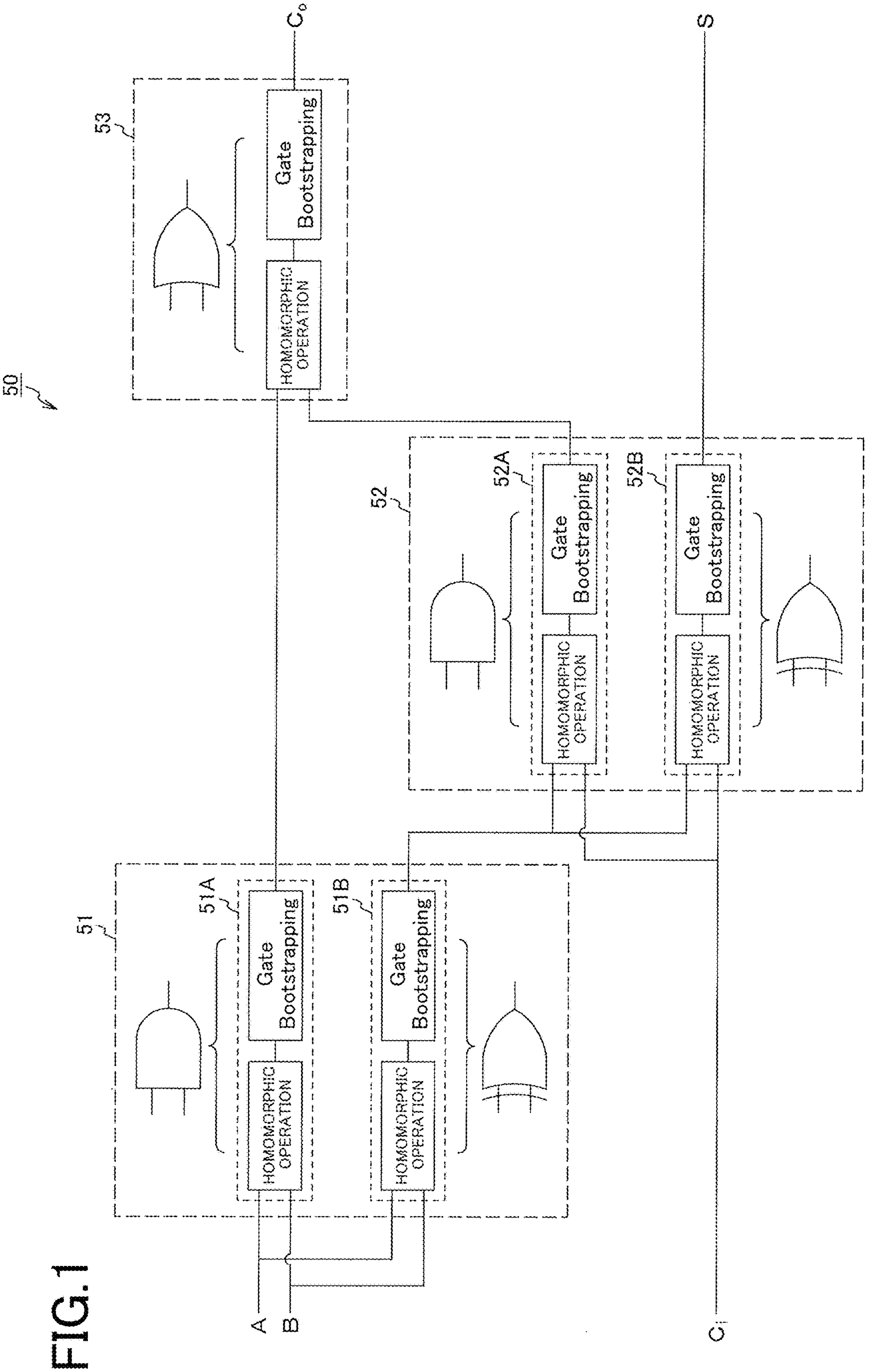
FIG. 1 is an explanatory diagram of a configuration of a full adder circuit configured by a minimum number of logical operation elements.

FIG. 1 is a diagram illustrating an example of a full adder circuit configured by a minimum number of logical operation elements.

Although FIG. 1 illustrates a full adder as a hardware circuit configured by logical operation elements, the full adder may be considered as a full adder program to be executed by a software implemented by a CPU.

When the processing for Bit-wise type homomorphic encryption is implemented by software, an operation is performed with a concept of designing a logic circuit (a logic gate) for a ciphertext.

This description can also be applied to the encryption processing device of the present embodiment described with reference to FIG. 2 and subsequent drawings.

A full adder circuit 50 is configured by two half adders 51 and 52 and an OR circuit unit (an arithmetic processing unit for obtaining OR) 53.

The first half adder 51 includes an AND circuit unit (an arithmetic processing unit for obtaining AND) 51A and an XOR circuit unit (an arithmetic processing unit for obtaining XOR) 51B.

The second half adder 52 includes an AND circuit unit 52A (an arithmetic processing unit for obtaining AND) and an XOR circuit unit (an arithmetic processing unit for obtaining XOR) 52B.

Inputs A and B to be added to each other are input to the AND circuit unit 51A and the XOR circuit unit 51B of the first half adder 51.

An output of the AND circuit unit 51A of the first half adder 51 and an output of the AND circuit unit 52A of the second half adder 52 are input to the OR circuit unit 53 in the latter stage, and a carry output $C_o$ (Carry out) is output from the OR circuit unit 53.

An output from the XOR circuit unit 51B of the first half adder 51 and a carry input $C_i$ (Carry in) are input to the AND circuit unit 52A and the XOR circuit unit 52B of the second half adder 52.

An output S (Sum) of the full adder circuit 50 is output from the XOR circuit unit 52B of the second half adder 52.

As illustrated in FIG. 1, the full adder 50 includes two AND circuit units, two XOR circuit units, and an OR circuit unit and therefore includes five logical operation elements (processing units corresponding to the logical operation elements) in total.

Therefore, an operation by one full adder requires the operation time corresponding to the five logical operation elements. In TFHE described in the aforementioned paper, an operation by one logical operation element requires an operation time of about 16 ms, and the whole full adder 50 including five logical operation elements requires an operation time of about 80 ms. When such a full adder is used for an operation of fully homomorphic encryption by TFHE, Gate Bootstrapping has to be performed in the latter stage of an operation (a homomorphic operation) performed in a first stage of each of the five logical operation elements. Gate Bootstrapping occupies almost all the processing time of a homomorphic logical operation.

Therefore, an operation of fully homomorphic encryption by the full adder circuit 50 in FIG. 1 can be considered as requiring the operation time corresponding to five times of Gate Bootstrapping.

An operation by each AND circuit unit and an operation by each XOR circuit unit in the half adder 51 and the half adder 52 have no dependence on each other. Therefore, in a case of configuring the full adder by software, operations can be performed in parallel in a multithreading manner, for example.

Performing operations in parallel enables an operation by a half adder to be performed in the operation time corresponding to one logical operation element.

Therefore, the operation by the one full adder illustrated in FIG. 1 can be performed in the operation time corresponding to three logical operation elements. However, the operation by one full adder requires an operation time of 48 ms even in this case. This time is substantially the same as the operation time required for performing Gate Bootstrapping three times.

TFHE is Bit-wise type encryption that is based on a logic gate such as an AND circuit unit or an XOR circuit unit.

By using a full adder, all of addition, subtraction, multiplication, and division (four arithmetic operations) of an integer and a comparison operation can be handled.

However, in Bit-wise type encryption, one ciphertext can only have 1 bit of information.

Addition, subtraction, multiplication, division, and comparison (comparison is equivalent to whether a result of subtraction is positive or negative) between integers are frequently used in various types of data processing, and handled data usually has a large bit length.

For example, it is necessary to process 32 ciphertexts in order to handle a 32-bit integer.

As for Bit-wise type fully homomorphic encryption, when addition or subtraction is performed for 32-bit integers, one half adder and 31 full adders are used. In multiplication, full adders the number of which is near 32 squared (1024) are used.

In order to make an operation (four arithmetic operations and comparison) of fully homomorphic encryption more practical, it is important to further enhance the speed of an operation by a full adder frequently used for the operation of fully homomorphic encryption.

As described below, the encryption processing device of the present embodiment reduces the number of times of homomorphic operations by performing SampleExtract multiple times in one operation of BlindRotate in Gate Bootstrapping and performing an operation for ciphertexts respectively obtained by SampleExtract performed multiple times, in particular, in a full adder used for an operation of fully homomorphic encryption. As a result, the encryption processing device of the present embodiment can reduce the number of times of Gate Bootstrapping that requires a long operation time (in particular, BlindRotate that requires a long time) in the subsequent stage of a homomorphic operation and can largely reduce a processing time of fully homomorphic encryption.

Figure 2:
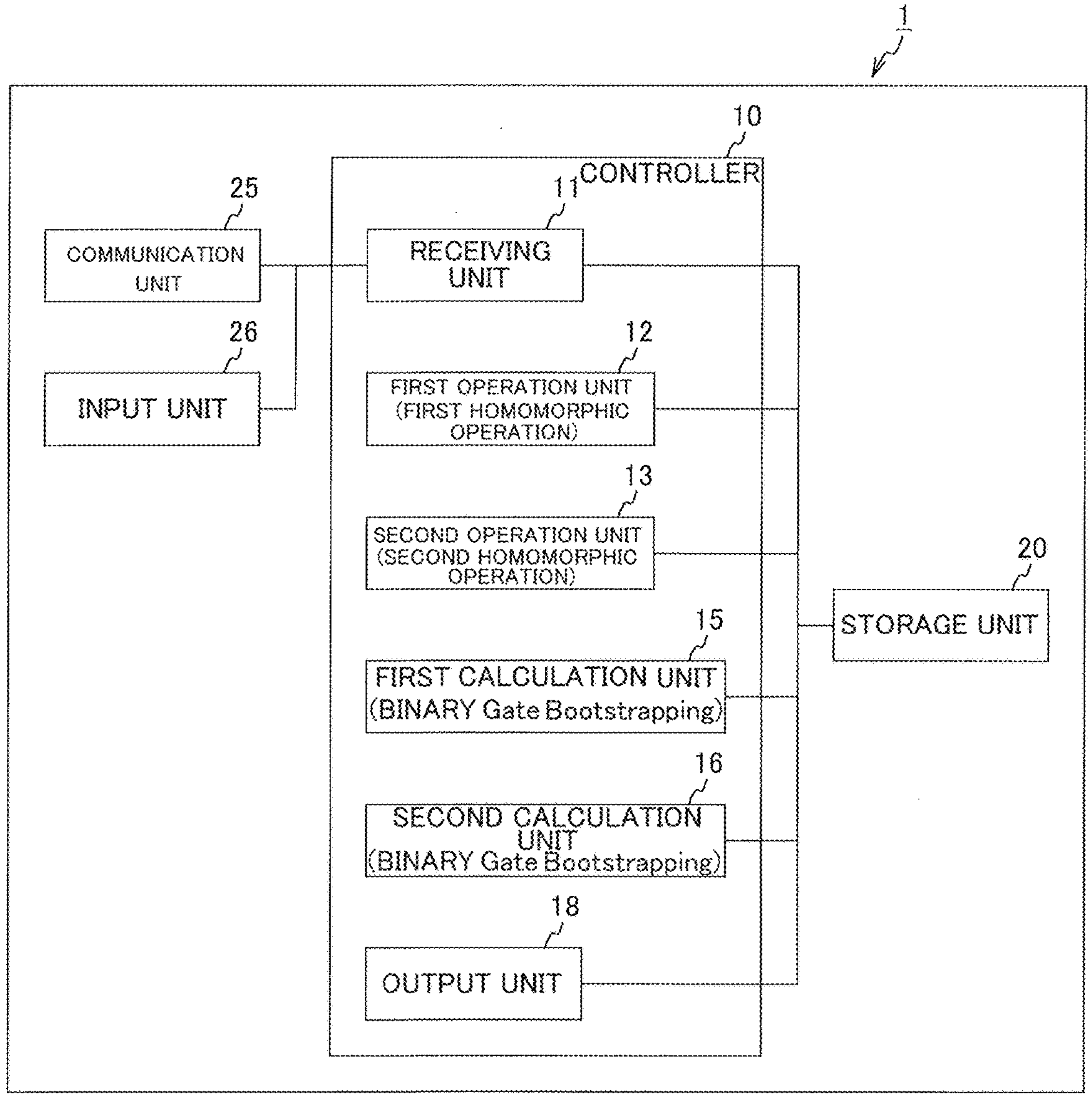
FIG. 2 is an explanatory diagram of a functional configuration of an encryption processing device of the present embodiment.

FIG. 2 is an explanatory diagram of a functional configuration of the encryption processing device of the present embodiment.

An encryption processing device 1 includes a controller 10, a storage unit 20, a communication unit 25, and an input unit 26.

The controller 10 includes a receiving unit 11, a first operation unit 12, a second operation unit 13, a first Bootstrapping unit (a first calculation unit) 15, a second Bootstrapping unit (a second calculation unit) 16, and an output unit 18.

The receiving unit 11 receives input of a ciphertext that is an object of an operation, via the communication unit 25 and the input unit 26.

The first operation unit 12 performs a first homomorphic operation for the input ciphertext received by the receiving unit 11.

The second operation unit 13 performs a second homomorphic operation for a ciphertext from the first Bootstrapping unit 15 and a temporary ciphertext from the second Bootstrapping unit 16.

The first and second operation units 12 and 13 are arithmetic processing units each of which implements an operation (a homomorphic operation) by a full adder configured by the logic gates (the AND circuit unit and the XOR circuit unit) described in FIG. 1, by software. At least one of the first and second operation units 12 and 13 may be implemented by hardware.

The first Bootstrapping unit 15 performs a Gate Bootstrapping process based on the result of the first homomorphic operation by the first operation unit 12 to obtain a carry output of a half adder.

The second Bootstrapping unit 16 performs a Gate Bootstrapping process based on the result of the first homomorphic operation by the first operation unit 12 and the result of the second homomorphic operation by the second operation unit 13 to obtain a sum of the half adder.

The output unit 18 outputs a final operation result to outside of the encryption processing device 1 or to another processing process performed in the encryption processing device 1.

The storage unit 20 can store therein an input ciphertext, a temporary file and temporary data used in an operation by a full adder, and an output ciphertext.

An encrypted encryption database 60 can also be stored in the storage unit 20.

The communication unit 25 connects the encryption processing device 1 to a network, thereby enabling communication between the encryption processing device 1 and an external device.

The encryption processing device 1 can serve as a database server by storing the encrypted encryption database 60 in the storage unit 20 and including the communication unit 25. In this case, the encryption processing device 1 can receive an encrypted query from a terminal device as the external device, search the encrypted encryption database 60, and send an encrypted search result to the terminal device.

The input unit 26 inputs a ciphertext that is an object of arithmetic processing to the encryption processing device 1.

Figure 3:
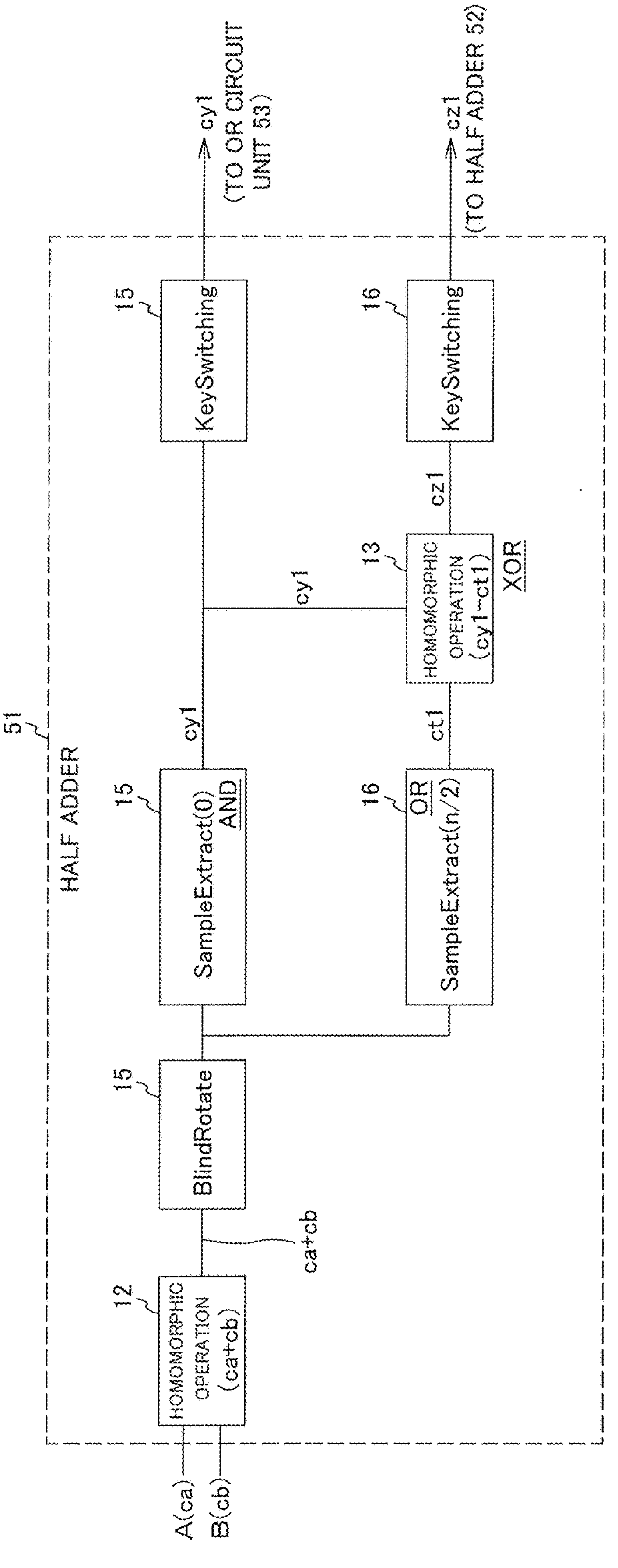
FIG. 3 is a more detailed explanatory diagram of an operation process by a full adder based on the functional configuration in FIG. 2 (Part 1)
Figure 4:
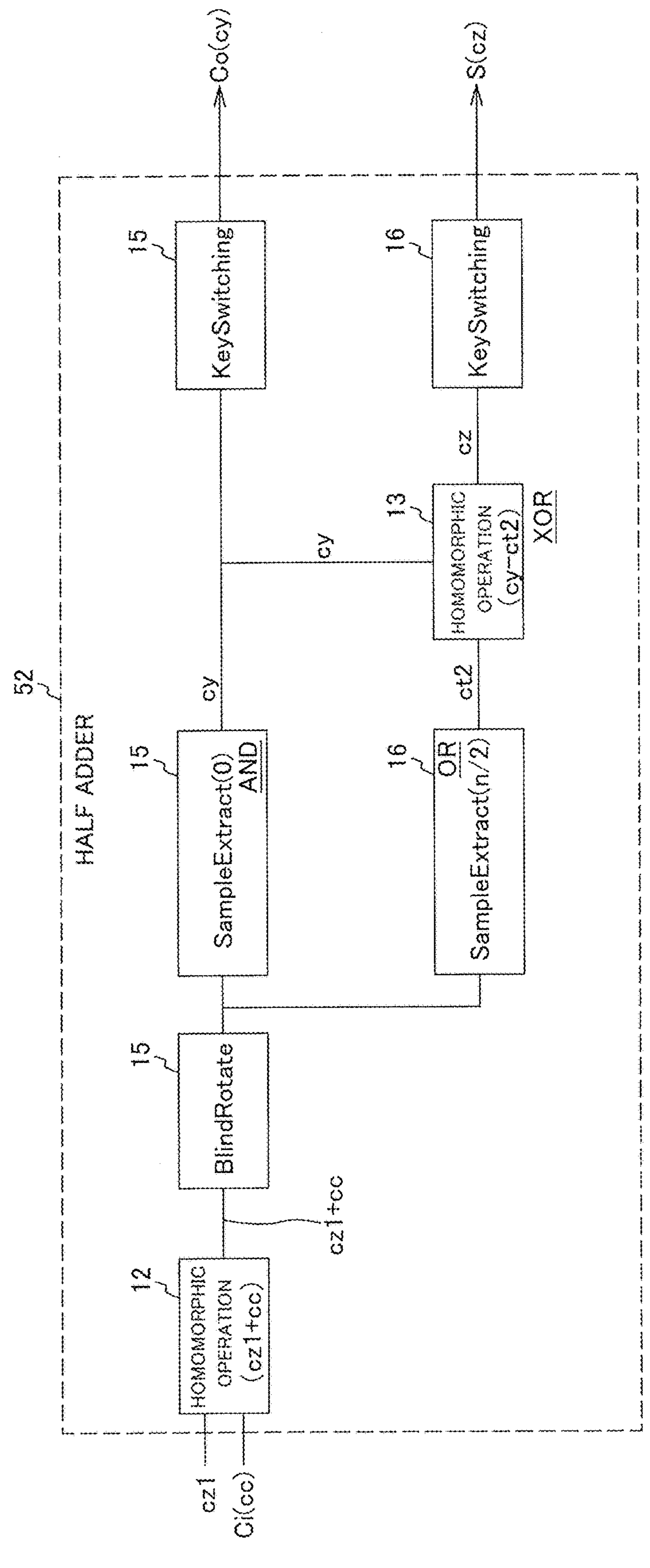
FIG. 4 is a more detailed explanatory diagram of an operation process by the full adder based on the functional configuration in FIG. 2 (Part 2)

FIGS. 3 and 4 are more detailed explanatory diagrams of an operation process by a full adder based on the functional configuration in FIG. 2.

In the descriptions of FIGS. 3 and 4, ciphertexts ca, cb, and cc input to the encryption processing device 1 are all TLWE ciphertexts described in the aforementioned paper.

TLWE encryption is Bit-wise type fully homomorphic encryption that has 0 or a value μ (non-0) as a plaintext, which will be descried in detail below.

Various operations can be performed by logical operations using logic gates.

Further, as described later, a TLWE ciphertext has two values as a plaintext, each value being obtained by adding an error with a predetermined variance to a predetermined value corresponding to a binary symbol 0 or 1. The TLWE ciphertext can be subjected to a logical operation without being decrypted.

The configuration illustrated in FIGS. 3 and 4 uses (binary) Gate Bootstrapping presented in the paper of Non-Patent Literature 1 (the aforementioned paper).

Gate Bootstrapping in TFHE presented in the aforementioned paper will be described in detail below.

In the process by the half adder 51 provided in the preceding stage in FIG. 3, the input ciphertexts ca and cb are input to the first operation unit 12 and are subjected to a homomorphic operation, and the operation result (a ciphertext ca+cb) is input to the first Bootstrapping unit 15 that performs binary Gate Bootstrapping.

An output of binary Gate Bootstrapping is a ciphertext that can have either one of two values (0, μ) as a plaintext.

The output of the first operation unit 12 is input to the first Bootstrapping unit 15, and the first Bootstrapping unit 15 performs BlindRotate for the operation result of the first operation unit 12 as a Bootstrapping process.

The first Bootstrapping unit 15 performs SampleExtract (0) at the 0 position for a TRLWE ciphertext obtained as the result of BlindRotate.

The first Bootstrapping unit 15 then performs key switching for a TLWE ciphertext cy1 thus obtained, and outputs the result as a carry output of the half adder 51.

The second Bootstrapping unit 16 performs SampleExtract(n/2) at the n/2 position for the result of BlindRotate by the first Bootstrapping unit 15 to obtain a TLWE ciphertext ct1.

Further, the second operation unit 13 performs a homomorphic operation for the TLWE ciphertext cy1 and the TLWE ciphertext ct1 obtained by SampleExtract by the first and second Bootstrapping units 15 and 16 to obtain a TLWE ciphertext cz1.

The second Bootstrapping unit 16 performs key switching for the TLWE ciphertext cz1 and outputs the result as a sum of a half adder.

In the process by the half adder 52 provided in the subsequent stage in FIG. 4, the input ciphertexts cz1 and cc are input to the first operation unit 12 and are subjected to a homomorphic operation, and the operation result (a ciphertext cz1+cc) is input to the first Bootstrapping unit 15 that performs binary Gate Bootstrapping.

The output of the first operation unit 12 is input to the first Bootstrapping unit 15, and the first Bootstrapping unit 15 performs BlindRotate for the operation result of the first operation unit 12 as a Bootstrapping process.

The first Bootstrapping unit 15 performs SampleExtract (0) at the 0 position for a TRLWE ciphertext obtained as the result of BlindRotate.

The first Bootstrapping unit 15 then performs key switching for a TLWE ciphertext cy thus obtained, and outputs the result as a carry output of the half adder 52.

The second Bootstrapping unit 16 performs SampleExtract(n/2) at the n/2 position for the result of BlindRotate by the first Bootstrapping unit 15 to obtain a TLWE ciphertext ct2.

Further, the second operation unit 13 performs a homomorphic operation for the TLWE ciphertext cy and the TLWE ciphertext ct2 obtained by SampleExtract by the first and second Bootstrapping units 15 and 16 to obtain a TLWE ciphertext cz.

The second Bootstrapping unit 16 performs key switching for the TLWE ciphertext cz and outputs the result as a sum of a half adder, that is, a sum of a full adder.

A time required for the homomorphic operation by the first operation unit 12 and a time required for the homomorphic operation by the second operation unit 13 are very short.

Gate Bootstrapping consumes almost all the processing time when processing is performed by a full adder using a homomorphic operation. In addition, most of the processing time of Gate Bootstrapping is occupied by BlindRotate.

In a case of performing an operation by a full adder using binary Gate Bootstrapping as in the full adder circuit 50 illustrated in FIG. 1, it is necessary to perform Gate Bootstrapping once in the subsequent stage in each of the AND circuit units 51A and 52A, the XOR circuit units 51B and 52B, and the OR circuit unit 53, i.e., five times in total.

The encryption processing device 1 can reduce the number of times of Gate Bootstrapping that occupies almost all the homomorphic operation processing, in particular, the number of times of BlindRotate that takes time, to three in total. Three times is the sum of once of BlindRotate in each of the above half adders, i.e., twice in total, and once of BlindRotate in Gate Bootstrapping of the OR circuit unit.

The encryption processing device 1 can reduce a computation processing time by about 40% simply, as compared with the full adder circuit 50 illustrated in FIG. 1. Details will be described later.

Since Gate Bootstrapping occupies almost all the operation time of a full adder related to fully homomorphic encryption, the encryption processing device 1 can remarkably enhance the speed of an operation by the full adder by reducing the number of times of Gate Bootstrapping.

Gate Bootstrapping explained in TFHE is described in detail.

Gate Bootstrapping is a method for making fully homomorphic encryption, which has not been practical because of a huge amount of data and its operation time, practical.

TFHE in the aforementioned paper uses encryption in which LWE encryption is configured over a circle group, so called "TLWE encryption", and achieves various types of homomorphic logical operations (and furthermore any operation such as addition or multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a unique case of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

Figure 5:
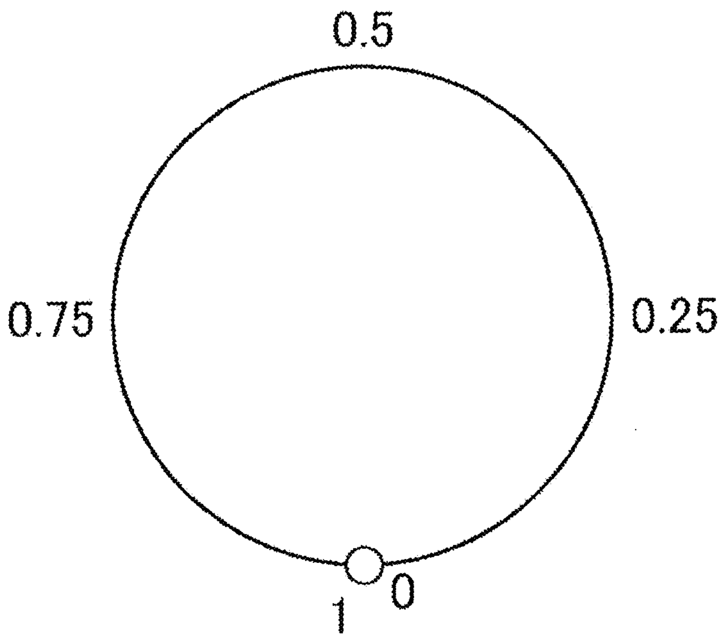
FIG. 5 is an image diagram for explaining a circle group that TLWE encryption has as a plaintext.

FIG. 5 is an image diagram for explaining a circle group that TLWE encryption has as a plaintext.

TLWE encryption has a real number $\mu$, as a plaintext, that corresponds to a point 0 on a circle group $\{T\}$ illustrated in FIG. 5 that moves forward from 0 with a real number precision and, when reaching 1, returns to 0 or any point (non-0) other than 0 on the circle group $\{T\}$. TLWE encryption itself regards any point on a circle group as a plaintext, and uses a range near 0 (including an error) and a range near $\mu$ (including an error) as a plaintext.

The point on the circle group $\{T\}$ is also described as an "element" in the present specification.

An encryption processing device handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

[TLWE Encryption]

TLWE encryption is described.

A vector [a] obtained by collecting N random numbers uniformly distributed is prepared as an element on the circle group $\{T\}$. In addition, a private key [s] obtained by collecting N values that can be 0 or 1 is prepared.

Assuming that a random number in the Gaussian distribution (the normal distribution) in which an average value is a plaintext $\mu$ and a variance is preset to $\alpha$ is e, an example of a TLWE ciphertext is a pair ([a], [s]·[a]+e).

An average value of e when an infinite number of TLWE ciphertexts are created for the same plaintext μ is a plaintext μ, where μ is a plaintext without an error and e is a plaintext with an error.

Symbol "·" represents a dot product of vectors. This description is also applied to the following descriptions.

When [s]·[a]+e described above is written as b, the TLWE ciphertext can be represented as ([a], b).

A function $\varphi_s$(([a], b)=b-[s]·[a]=e is a function of decrypting the TLWE ciphertext. Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When ([a]+[a'], b+b') obtained by adding two TLWE ciphertexts ([a], b) and ([a'], b') together as they are is input to the aforementioned decryption function $\varphi_s$, a sum of the two plaintexts is obtained as represented by $$\varphi_s(([a]+[a'],b+b'))=(b+b')-[s]\cdot([a]+[a'])=(b-[s]\cdot[a])+(b'-[s]\cdot[a'])=\varphi_s([a],b)+\varphi_s([a'],b').$$

It is thus found that a TLWE ciphertext is a ciphertext obtained by "additive homomorphic encryption".

In TFHE in the aforementioned paper, various operations are achieved by repeating performing an additive operation for TLWE ciphertexts each obtained by adding an error to a plaintext and reducing an error by Gate Bootstrapping.

In the following descriptions, a trivial ciphertext such as ([0], μ) is a TLWE ciphertext that can be decrypted with any private key, that is, a ciphertext that can be decrypted with any private key to provide the same plaintext.

In ([0], μ), [0] represents a zero vector.

Although the trivial ciphertext can be handled as a TLWE ciphertext, it can be considered as a state where a plaintext is placed in the ciphertext substantially as it is.

When the decryption function $\varphi_s$ is applied to the TLWE ciphertext ([0], μ), the private key [s] is multiplied by the zero vector [0] to disappear as represented by $\varphi_s$(([0], μ))=μ−[s]·0=μ. The plaintext μ is thus obtained easily. Such a ciphertext is a trivial ciphertext with regard to the plaintext μ.

A finite cyclic group used in Gate Bootstrapping in TFHE is described.

Gate Bootstrapping uses a factor ring of a polynomial ring as a finite cyclic group.

The following description explains that a factor ring of a polynomial ring is a finite cyclic group.

An n-th degree polynomial is generally represented by $a_n x^n+a_{n-1}x^{n-1}+\ldots+a_0$.

These all sets form a commutative group for a sum of polynomials f(x)+g(x).

Further, a product of polynomials f(x)g(x) has properties identical to those of the commutative group except that an inverse element is not necessarily present. Such a structure is called "monoid".

Regarding the sum and the product of polynomials, the distributive property is established as follows.

$$f(x)\{g(x)+g'(x)\}=f(x)g(x)+f(x)g'(x)$$

Therefore, when the sum and the product of polynomials are defined using polynomials as elements, a ring is formed, which is called "polynomial ring".

TFHE uses a polynomial ring including the circle group {T} that is a finite cyclic group as coefficients, and such a polynomial ring is represented as T[X].

When a polynomial T(X), which is a polynomial ring, is decomposed into T[X]($X^n$+1)+T[X], and only remainders are extracted and collected, a factor ring of a polynomial ring is obtained because the remainders also form a ring.

In TFHE, a factor ring of a polynomial ring is represented as T[X]/($X^n$+1).

A polynomial $F(X)=\mu X^{n-1}+\mu X^{n-2}+\ldots\mu X+\mu$ is extracted by using a desired coefficient μ (μ belongs to T) as an element of the factor ring of the polynomial ring T[X]/($X^n$+1).

When the element F(X) of the factor ring of the polynomial ring is multiplied by X, $\mu X^{n-1}+\mu X^{n-2}+\ldots+\mu X-\mu$ is obtained, the coefficient of the top term appears as a constant term with a sign reversed from positive to negative.

When multiplication by X is further performed, the same phenomenon happens again as represented by $\mu X^{n-1}+\mu X^{n-2}+\ldots+\mu X^2-\mu X-\mu$. That is, the coefficient of the top term appears as a constant term with a sign reversed from positive to negative.

When this multiplication is repeated n times, $-\mu X^{n-1}-\mu X^{n-2}\ldots-\mu X-\mu$ is obtained, so that the coefficients of all terms become negative.

When multiplication by X is further continued, the coefficient of the top term becomes positive from negative and appears as a constant term as represented by $$-\mu X^{n-1}-\mu X^{n-2}\ldots-\mu X+\mu,$$

$$-\mu X^{n-1}-\mu X^{n-2}\ldots+\mu X+\mu.$$

When multiplication by X is repeated 2n times in total, the multiplication result returns to the original element of the factor ring of the polynomial ring $F(X)=\mu X^{n-1}+\mu X^{n-2}+\ldots+\mu X+\mu$. As described above, the highest-order coefficient (μ) appears as the lowest-order constant term with a reversed sign (−μ), and terms are shifted by one in whole.

That is, the polynomial $F(X)=\mu X^{n-1}+\mu X^{n-2}+\ldots+\mu X+\mu$ is a finite cyclic group of order 2n in a ring that is the factor ring of the polynomial ring T[X]/($X^n$+1).

In TFHE, an encryption processing device achieves fully homomorphic encryption by using such properties of the polynomial F(X) based on a factor ring of a polynomial ring.

[TRLWE Encryption]

Gate Bootstrapping uses encryption called TRLWE encryption in addition to TLWE encryption.

TRLWE encryption is described.

The character R in TRLWE encryption means a ring, and TRLWE encryption is LWE encryption configured by a ring. TRLWE is also additive homomorphic encryption, as TLWE encryption is.

A ring in TRLWE encryption is the factor ring of a polynomial ring T[X]/($X^n$+1) described above.

In order to obtain TRLWE encryption, elements of the factor ring of a polynomial ring T[X]/($X^n$+1) are selected at random.

In fact, n coefficients in an (n−1)th degree polynomial are selected as uniformly distributed random numbers from the circle group {T}.

When the degree of the polynomial is n−1, the polynomial is not divided by $X^n$+1, and it is not necessary to consider a remainder. Therefore, it is assumed that the (n−1)th degree polynomial is a polynomial a(X).

A polynomial s(X) used as a private key is structured as follows, by collecting n values each of which can be 0 or 1 at random.

$$s(X)=s_{n-1}X^{n-1}+s_{n-2}X^{n-2}+\dots s_1X+s_0$$

Assuming that n random numbers $e_i$ are random numbers in the Gaussian distribution (the normal distribution) in which an average value is a plaintext $\mu_i$ and a variance is α, the following polynomial e(X) is structured from these random numbers.

$$e(X)=e_{n-1}X^{n-1}+e_{n-2}X^{n-2}+\dots e_1X+e_0$$

Decomposition of s(X) a(X)+e(X) is performed into f(X)($X^n$+1)+b(X), and b(X) is obtained.

Consequently, (a(X), b(X)) is obtained as a TRLWE ciphertext.

In TRLWE encryption, encryption is performed using random numbers similarly to TLWE encryption, and therefore innumerable ciphertexts can correspond to the same private key and the same plaintext.

In addition, in TRLWE encryption, g(X) is determined in such a manner that $\varphi_s$ becomes an element of T[X]/($X^n$+1) serves as a decryption function, where $\varphi_s$((a(X), b(X))=b (X)−s(X)·a(X)+g(X)($X^n$+1), as in TLWE encryption.

[Gadget Decomposition]

Gadget Decomposition is described.

A coefficient in a polynomial used in a TRLWE ciphertext is a real number that is an element of the circle group {T} in FIG. 5 and is equal to or larger than 0 and less than 1, and only has a fractional part.

An operation of decomposing this coefficient into several bits in binary notation is defined as Gadget Decomposition (Dec) in TFHE in the aforementioned paper.

For example, assuming that the degree n of the polynomial F(X) of a TRLWE ciphertext is 2, one unit of decomposition is $Bg=2^2$, and decomposition into 1=3 elements is performed. At this time, each element is arranged to enter between −Bg/2 and Bg/2.

A TRLWE ciphertext is a combination of two polynomials like (a(X), b(X)) as described above. Therefore, a TRLWE ciphertext d can be written as $$d=[0.75X^2+0.125X+0.5,\ 0.25X^2+0.5X+0.375]$$

by being regarded as a two-dimensional vector having polynomials that serve as elements of a factor ring of a polynomial ring, as elements. Accordingly, in the following descriptions, each element is decomposed into the form of a sum of powers of $Bg^{-1}$=0.25.

Since 0.75=−0.25 is established on the circle group {T}, decomposition can be performed as follows.

$$d=[0.75X^2+0.125X+0.5,\ 0.25X^2+0.5X+0.375]$$

$$=[-\mathbf{0.25}X^2+0.125X+0.5,\ 0.25X^2+0.5X+0.25+0.125]$$

$$=[0.25\times(-X^2+2)+0.25^2\times 2X+0.25^3\times 0,\ 0.25\times(X^2+2X+1)\ 9+0.25X^2\times 2+0.25^3\times 0]$$

Therefore, when Gadget Decomposition is performed, a vector $$\mathrm{Dec}(d)=[-X^2+2,\ 2X,\ 0,\ X^2+2X+1,\ 2,\ 0]$$

is obtained.

An operator H of inverse transform from a vector to a ciphertext is also defined.

When the description is provided based on the example described above, a matrix $$H=\begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

becomes the operator H of inverse transform. A TRLWE ciphertext d' is obtained by performing an operation Dec(d)·H. The lower bits are rounded off.

It can also be said that an operation of obtaining [v] that makes ||d−[v]·H|| minimum with respect to the TRLWE ciphertext d is Gadget Decomposition. Here, || is a vector norm (length).

Ciphertexts Zi=(a(X), b(X)) formed by polynomials in which all coefficients of e(X) have an average value of 0 and a variance is α are created. The number of the created ciphertexts is 21.

The plaintext μ is encrypted in the following manner, whereby the following ciphertext k is obtained.

$$k=\begin{pmatrix} Z_1 \\ Z_2 \\ \vdots \\ Z_{2\ell} \end{pmatrix}+\mu\times H$$

This ciphertext k is defined as a TRGSW ciphertext BK.

The TRGSW ciphertext BK configures a Bootstrapping Key used below.

The Bootstrapping Key is described.

The Bootstrapping Key is used for encrypting a private key in order to use the private key in Gate Bootstrapping.

Separately from the private key [s] (Nth degree) used for TLWE ciphertexts, each element of a private key [s'] for encrypting the private key [s] is selected to be either of two values, i.e., 0 or 1 for use in Gate Bootstrapping.

It is necessary to make the degree of the private key [s'] the same as the degree n of polynomials used in TRLWE encryption.

The TRGSW ciphertext BK is created for each element of the private key [s].

When decryption with the private key [s'] is performed, 21 TRLWE ciphertexts Zj are created where $\varphi_s$(Zj)=0 is satisfied.

$BK_i$ is then represented by $$BK_i=\begin{pmatrix} Z_1 \\ Z_2 \\ \vdots \\ Z_{2\ell} \end{pmatrix}+s_i\cdot H$$

as in the above-described configuration of the TRGSW ciphertext.

N TRGSW ciphertexts having this configuration are prepared, where N is the same as the degree of the private key [s]. A set of the thus prepared TRGSW ciphertexts is referred to as "Bootstrapping Key".

A cross product of the TRGSW ciphertext BKi and the TRLWE ciphertext d is defined as follows.

$$BKi\times d=\mathrm{Dec}(d)\cdot BKi$$

Gadget Decomposition is an operation of obtaining [v] that makes ||d−[v]·H|| minimum with respect to the TRLWE ciphertext d.

Therefore, by using [v]=Dec(d) and an error ($\varepsilon_a(X)$, $\varepsilon_b(X)$), [v]·H=d+($\varepsilon_a(X)$, $\varepsilon_b(X)$) can be written.

As a result, BKi×d=Dec(d)·BKi $$= \vec{v} \cdot \begin{pmatrix} Z_1 \\ Z_2 \\ \vdots \\ Z_{2\ell} \end{pmatrix} + s_i \times \vec{v} \cdot H$$

is obtained.

When the left side calculates a dot product, and [v]·H=d+($\varepsilon_a(X)$, $\varepsilon_b(X)$) is substituted into the right side, $$= \sum_{j=1}^{2\ell} v_j \times Z_j + s_i \times (d + (\epsilon_a(X), \epsilon_b(X)))$$

$$= \sum_{j=1}^{2\ell} v_j \times Z_j + s_i \times d + s_i(\epsilon_a(X), \epsilon_b(X))$$

is obtained, and becomes the same as calculation of a sum of the following three ciphertexts c1, c2, and c3.

$$c_1 = \sum_{j=1}^{2\ell} v_j \times Z_j$$

$$c_2 = s_i \times d$$

$$c_3 = s_i \times (\epsilon_a(X), \epsilon_b(X))$$

Since TRLWE encryption is additive homomorphic encryption, calculating a sum of ciphertexts is the same as calculating a sum of plaintexts.

Since $c_1$ is obtained by adding several times of $Z_j$, an expected value of the plaintext $\varphi_s$·($c_1$) is 0.

In addition, $\varphi_s$($c_3$) obtained by decryption is set to be sufficiently small also in the subsequent operations, because the magnitude of the absolute value of a plaintext can be limited by a system parameter.

In this case, $\varphi_s$·(BKi×d)=$\varphi_s$·($s_i$×d) is obtained, but the calculation result is the sum of the above three ciphertexts c1, c2, and c3 regardless of whether $s_i$ is 0 or 1. Whether $s_i$ is 0 or 1 cannot be determined by a simple comparison.

Assuming that there are TRLWE ciphertexts $d_0$ and $d_1$ respectively corresponding to two plaintexts $\mu_0$ and $\mu_1$, when $d_1-d_0$ is substituted for d, and $d_0$ is finally added, the following CMux function is completed.

$$\mathrm{CMux}(BK_i, d_0, d_1) = BKi \times (d_1 - d_0) + d_0 = Dec(d_1 - d_0) \cdot BK_i + d_0$$

The CMux function outputs a ciphertext of the plaintext to without decrypting the ciphertext when $s_i$ is 0, and outputs a ciphertext of the plaintext $\mu_1$ without decrypting the ciphertext when $s_i$ is 1.

Although the CMux function can calculate the ciphertext of the plaintext $\mu_0$ or the plaintext $\mu_1$, it is not possible to know which one is selected.

Binary Gate Bootstrapping in TFHE is performed using the various information described above.

Binary Gate Bootstrapping is configured by three steps described below, i.e., (1) BlindRotate, (2) SampleExtract, and (3) KeySwitching.

Figure 6:
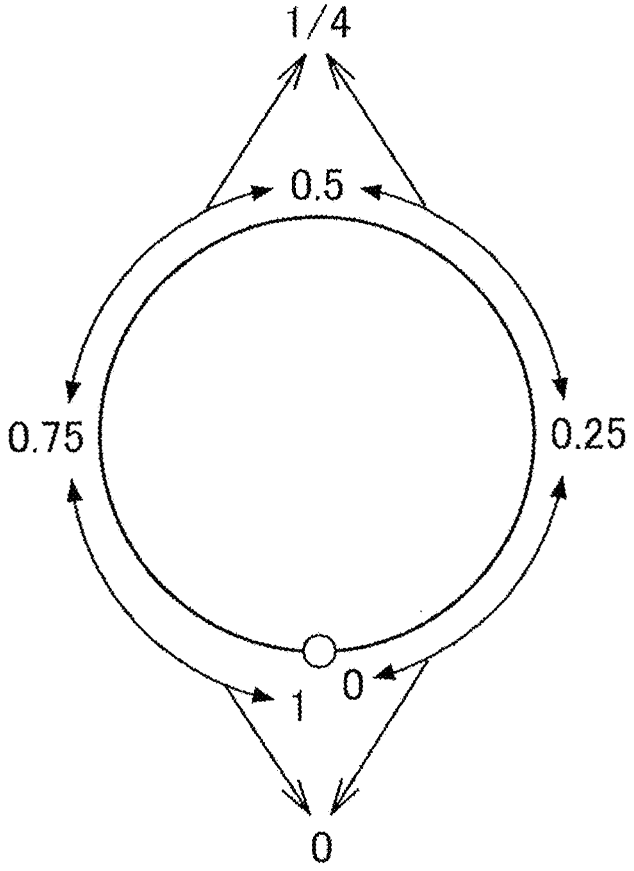
FIG. 6 is an operation image diagram of binary Gate Bootstrapping.

FIG. 6 is an operation image diagram of binary Gate Bootstrapping.

Binary Gate Bootstrapping reduces an error for a plaintext included in a result of a homomorphic operation between TLWE ciphertexts by three steps descried below.

In the following descriptions, unless otherwise specified, a plaintext means a result of an operation between plaintexts obtained as a result of an operation between TLWE ciphertexts.

A plaintext in a section from 0 to 0.25 (¼) or 0.75 (¾) to 1 on the circle group {T} in FIG. 5 is converted to a TLWE ciphertext 0, and a plaintext in a section from 0.25 (¼) to 0.75 (¾) is converted to a ciphertext 0.25 (¼).

An error added to the plaintext in this conversion is any error in a range of ±1/16.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{-\varphi s(c')}$ is obtained without decryption. "0" indicates a 0th degree polynomial 0.

Here, φs(c) is a plaintext obtained by applying a decryption function to the following LWE ciphertext c'.

In BlindRotate, the following polynomial T(X)

$$T(X)=F(X)\cdot X^{n/2}$$

is prepared, which is obtained by multiplying the following polynomial F(X)

$$F(X)=\mu X^{n-1}+\mu X^{n-2}+\ldots \mu X+\mu$$

where μ=⅛, that forms the above-described finite cyclic group and serves as a test vector, by $X^{n/2}$.

It is assumed that there is a TLWE ciphertext c obtained by encrypting the plaintext μ1 with the private key [s].

Each element of this TLWE ciphertext c=([a], b) is multiplied by 2n and is then rounded off, whereby a LWE ciphertext c'=([a'], b') is obtained.

When the LWE ciphertext c'=([a'], b') is decrypted, μ1'=$\varphi_s$(c)≈2n×$\varphi_s$(c)=2nμ1 is obtained. As n becomes larger, an error becomes smaller relatively.

A trivial TRLWE ciphertext (0, T(X)) whose plaintext is the polynomial T(X) is prepared, and it is assumed that $A_0=X^{-b'}\times(0, T(X))=(0, X^{-b'}\times T(X))$, where 0 indicates a 0th degree polynomial 0. Since b' is an integer, a power of X can be defined naturally.

Subsequently, $A_i$=CMux($BK_i$, $A_{i-1}$, $X^{a'i}A_{i-1}$) is calculated in turn by using BK, that is the above-described Bootstrapping Key. Since a'i is an integer also in this expression, a power of X can be defined naturally.

Accordingly, the plaintext is not changed as it is when $s_i$ is 0, and multiplication by $X^{a'i}$ is performed in turn when $s_i$ is 1.

Therefore, when calculation is repeated as represented by $$\phi_{s'}(A_0) = X^{-b'}T(X)$$

$$\phi_{s'}(A_1) = X^{s_1 a'_1 - b'}T(X)$$

$$\phi_{s'}(A_2) = X^{s_2 a'_2 + s_1 a'_1 - b'}T(X),$$

then $$\phi_{s'}(A_n) = X^{\sum_{i=1}^{N} s_i \times a'_i - b'}T(X)$$

is obtained.

Here, $$\sum_{i=1}^{N} s_i \times a_i' - b'$$

is equal to the decryption function $\varphi_s(c)$ with a sign reversed. Therefore, $$\phi_{s'}(A_n) = X^{-\phi_s(c')}T(X)$$

is obtained. Here, $\varphi x'(A_n)$ is a ciphertext of a polynomial obtained by multiplying $\mu 1'$ times the polynomial T(X) by $X^{-1}$.

(2) SampleExtract

In the plaintext polynomial $\varphi_s'(A_n)$ obtained by decrypting the TRLWE ciphertext An obtained by BlindRotate in (1), $n/2-\varphi_s(c')$ terms from the lowest term have a coefficient of $-\mu$. When $\varphi_s'(A_n)$ is negative, coefficients are $-\mu$ from the highest term in turn conversely.

When attention is paid only to a constant term of the plaintext polynomial $\varphi_s'(A_n)$ obtained by decrypting the TRLWE ciphertext $A_n$, the constant term is $\mu$ if $\varphi_s(c')$ is equal to or greater than n/2 and less than 3n/2, that is, $\varphi_s(c)$ is ½±¼. Otherwise, i.e., if $\varphi_s(c)$ is ±¼, the constant term is $-\mu$.

SampleExtract is a process for extracting only the coefficient of the constant term of the plaintext polynomial $\varphi_s'(A_n)$ from the TRLWE ciphertext $A_n$ obtained by BlindRotate in (1) without decrypting the TRLWE ciphertext $A_n$, thereby obtaining a TLWE ciphertext cs.

The process for obtaining the TLWE ciphertext cs is described.

All TRLWE ciphertexts can be expressed as (A(X), B(X)) by putting polynomials $$A(X) = \sum_{i=1}^{n} a_i X^{i-1}$$
$$B(X) = \sum_{i=1}^{n} b_i X^{i-1},$$

where n is the degree.

When decryption with the private key [s'] is performed, the expression can be expanded by putting a polynomial of the private key as $$S'(X) = \sum_{j=1}^{n} s_j' X^{j-1}.$$

Then, $$\phi_{s'}(c) = B(X) - S'(X)\cdot A(X) = \sum_{i=1}^{n} b_i X^{i-1} - \sum_{i=1}^{n}\sum_{j=1}^{n} a_i s_j' X^{(i+j-2)}$$

is obtained.

The following operation is then performed with regard to this expression.

$$\begin{aligned}
&\sum_{i=1}^{n} b_i X^{i-1} - \sum_{i=1}^{n}\sum_{j=1}^{n} a_i s_j' X^{(i+j-2)} \\
&= \sum_{i=1}^{n} b_i X^{i-1} - \sum_{i=1}^{n}\sum_{j=i-1}^{n+i-2} a_i s_{j-i+2}' X^j \\
&= \sum_{i=1}^{n} b_i X^{i-1} - \sum_{i=1}^{n}\sum_{j=i-1}^{n-1} a_i s_{j-i+2}' X^j - \sum_{i=1}^{n}\sum_{j=n}^{n+i-2} a_i s_{j-i+2}' X^j \\
&= \sum_{j=1}^{n} b_j X^{j-1} - \sum_{j=0}^{n-1}\sum_{i=1}^{j+1} a_i s_{j-i+1}' X^j - \sum_{j=n}^{2n-2}\sum_{i=j-n+2}^{n} a_i s_{j-i+2}' X^j \\
&= \sum_{j=0}^{n-1} b_{j+1} X^j - \sum_{j=0}^{n-1}\sum_{i=0}^{j} a_{i+1} s_{j-i+1}' X^j - \sum_{j=0}^{n-2}\sum_{i=j-n+1}^{-1} a_{i+n+1} s_{j-i+1}' X^{j+n} \\
&= \sum_{j=0}^{n-2} b_{j+1} X^j + b_n X^{n-1} - \sum_{j=0}^{n-2}\sum_{i=0}^{j} a_{i+1} s_{j-i+1}' X^j - \sum_{i=0}^{n-1} a_{i+1} s_{n-i}' X^{n-1} - \sum_{j=0}^{n-2}\sum_{i=j-n+1}^{-1} a_{i+n+1} s_{j-i+1}' X^{j+n} \\
&= \sum_{j=0}^{n-2}\left(b_{j+1} X^j - \sum_{i=0}^{j} a_{i+1} s_{j-i+1}' X^j - \sum_{i=j-n+1}^{-1} a_{i+n+1} s_{j-i+1}' X^{j+n}\right) + b_N X^{n-1} - \sum_{i=0}^{n-1} a_{i+1} s_{n-i}' X^{n-1}
\end{aligned}$$

Since this is "factor ring of polynomial ring", a remainder when this is divided by $(X^n+1)$ is calculated. Then, $$\begin{aligned}
&\sum_{j=0}^{n-2}\left(b_{j+1} X^j - \sum_{i=0}^{j} a_{i+1} s_{j-i+1}' X^j + \sum_{i=j-n+1}^{-1} a_{i+n+1} s_{j-i+1}' X^j\right) + b_N X^{n-1} - \sum_{i=0}^{n-1} a_{i+1} s_{n-i}' X^{n-1} = \\
&\sum_{j=0}^{n-2}\left(b_{j+1} - \sum_{i=0}^{j} a_{i+1} s_{j-i+1}' + \sum_{i=j-n+1}^{-1} a_{i+n+1} s_{j-i+1}'\right) X^j + \left(b_n - \sum_{i=0}^{n-1} a_{i+1} s_{n-i}'\right) X^{n-1}
\end{aligned}$$

is obtained.

Further, when $$a_i' = \begin{cases} a_i & (i \geq 1) \\ -a_{i+n} & (\text{otherwise}) \end{cases}$$

is put, then $$\begin{aligned}
&= \sum_{j=0}^{n-2}\left(b_{j+1} - \sum_{i=0}^{j} a_{i+1}' s_{j-i+1}' - \sum_{i=j-n+1}^{-1} a_{i+1}' s_{j-i+1}'\right) X^j + \left(b_N - \sum_{i=0}^{n-1} a_{i+1}' s_{n-i}'\right) X^{n-1} \\
&= \sum_{j=0}^{n-2}\left(b_{j+1} - \sum_{i=j-n+1}^{j} a_{i+1}' s_{j-i+1}'\right) X^j + \left(b_N - \sum_{i=0}^{n-1} a_{i+1} s_{n-i}'\right) X^{n-1} \\
&= \sum_{j=0}^{n-2}\left(b_{j+1} - \sum_{i=0}^{n-1} a_{i+j-n+2}' s_{n-i}'\right) X^j + \left(b_n - \sum_{i=0}^{n-1} a_{i+1} s_{n-i}'\right) X^{n-1}
\end{aligned}$$

-continued $$= \sum_{j=0}^{n-1} \left(b_{j+1} - \sum_{i=0}^{n-1} a'_{i+j-n+2} s'_{n-i}\right) X^j$$

is obtained, and coefficients of respective terms in a plaintext polynomial are obtained from $$\phi_{s'}(c) = \sum_{j=0}^{n-1} \left(b_{j+1} - \sum_{i=0}^{n-1} a'_{i+j-n+2} s'_{n-i}\right) X^j.$$

Among the obtained coefficients, a coefficient of a constant term is necessary. Therefore, when a coefficient for j=0 is extracted, $$b_1 - \sum_{i=0}^{n-1} a'_{i-n+2} s'_{n-i}$$

is obtained. When $$a''_i = a'_{-i+2}$$

is put, the extracted coefficient can be transformed to a decryption function of TLWE encryption as represented by $$b_1 - \sum_{i=0}^{n-1} a''_{n-i} s'_{n-i} = b_1 - \sum_{i=0}^{n-1} a''_i s'_i = b_1 - \vec{s}' \cdot \vec{a}'' = \phi_{s'}(\vec{a}'', b_1).$$

That is, when coefficients are extracted from the TRLWE ciphertext $A_n$=(A(X), B(X)) obtained by BlindRotate in (1) while the coefficients are set as $$a''_i = \begin{cases} a_i & (i = 1) \\ -a_{-i+n+2} & (\text{otherwise}) \end{cases},$$

a new TLWE ciphertext ([a"], $b_1$) is obtained which has, as a plaintext, the same value as a constant term of a plaintext polynomial corresponding to the original TRLWE ciphertext $A_n$. This new TLWE ciphertext has either of two types, i.e., −μ or u as a plaintext.

A TLWE ciphertext cs=([a"], $b_1$)+([0], μ) obtained by adding a trivial ciphertext ([0], μ) of which plaintext is u to the thus obtained TLWE ciphertext is the output of SampleExtract.

Specifically, since μ is ⅛ in the polynomial F(X) as a test vector, a ciphertext of −⅛ or ⅛ is obtained in this stage.

When a trivial TLWE ciphertext ([0], ⅛) of which a plaintext is μ=⅛ is added to the output result of SampleExtract,

−⅛+⅛=0

⅛+⅛=¼ are established, and thus a new TLWE ciphertext cs having either of two values, i.e., 0 or ¼ as a plaintext is obtained.

(3) KeySwitching

The TLWE ciphertext cs obtained by using SampleExtract in (2) is encrypted with the private key [s'], not with the private key [s].

Therefore, it is necessary to replace the key of the TLWE ciphertext cs with the private key [s] and return the state of the ciphertext to a state where encryption has been performed with the private key [s], without decrypting the TLWE ciphertext cs.

Therefore, a method of KeySwitching is described.

The private key [s] of a TLWE ciphertext used in a NAND operation is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $$s'_i \times 2^{-1} s'_i \times 2^{-2} s'_i \times 2^{-3} \ldots.$$

The private key is [s]. A "number of digits" t is a system parameter.

When decryption is performed with the private key [s], $$\phi_s(KS_{i,j}) = s'_i \times 2^{-j}$$

is obtained. This is a "KeySwitching key".

As described above, the TLWE ciphertext cs=([a], b) obtained in (2) is 0 or ¼ obtained by encryption with the private key [s']. The number of elements of [a] is the same as that of the private key [s'] and is n.

When the elements are converted to t-bit fixed-point numbers one by one, the elements can be written in the following form.

$$a_i \approx \sum_{j=0}^{t} a_{i,j} \times 2^{-j}$$

Although an error is increased in this stage, the maximum value of the absolute value can be limited by a system parameter.

As main processing of KeySwitching, the following TLWE ciphertext cx is calculated.

$$cx = (\vec{0}, b) - \sum_{i=1}^{n} \sum_{j=1}^{t} a_{i,j} \times KS_{i,j}$$

Since the term ([0], b) is a trivial ciphertext, this term is b when being decrypted. A result of decryption of the TLWE ciphertext cx is calculated as follows.

$$\phi_s(cx) = b - \sum_{i=1}^{n} \sum_{j=1}^{t} a_{i,j} \times s'_i \times 2^{-j} = b - \sum_{i=1}^{n} \sum_{j=1}^{t} s'_i \times a_{i,j} \times 2^{-j}$$

Since $s'_i$ is a constant for j, it is factored out as follows.

$$= b - \sum_{i=1}^{n} s'_i \sum_{j=1}^{t} a_{i,j} \times 2^{-j}$$

The expression obtained by decomposition into fixed-point numbers descried above is then substituted.

$$\approx b - \sum_{i=1}^{n} s_i' \times a_i = \phi_{s'}\left(\left(\vec{a}, b\right)\right) = \phi_{s'}(c_s)$$

As a result, $$\phi_s(cx) \approx \phi_{s'}(c_s)$$

is obtained. That is, switching of keys is successful.

The TLWE ciphertext cx obtained here is encrypted with the private key [s] that is the same as a private key for the TLWE ciphertext c used as the input of Gate Bootstrapping.

By performing the processing of KeySwitching, the ciphertext returns to the TLWE ciphertext encrypted with the private key [s], so that its plaintext $\varphi_s(cx)$ is 0 when $\varphi_s(c)$ is in a range of ±¼, and is ¼ when $\varphi_s(c)$ is in a range of ½±¼.

By the processing described above, a TLWE ciphertext is obtained as a result of Gate Bootstrapping, which is either of two values, i.e., 0 or ¼ and has any error within ±1⁄16.

The maximum value of the error does not depend on the TLWE ciphertext c that is the input, and is a value fixed by a system parameter.

Therefore, the system parameter is set in such a manner that the maximum value of the error is any value within ±1⁄16 that is the same range as that for a TLWE ciphertext as the input.

This setting enables a NAND operation to be performed any number of times, and enables any operation including addition and multiplication to be performed.

Examples of an error added to a "plaintext" of a TLWE ciphertext output from Gate Bootstrapping include an error added by converting a TLWE ciphertext to an integer, an error added by CMux, and an error when the TLWE ciphertext is converted to a fixed-point number by KeySwitching. All these errors can be limited by a system parameter, and the system parameter can be adjusted in such a manner that an error for which all things are considered falls within ±1⁄16.

The processing described above is processing of Gate Bootstrapping in TFHE.

The present embodiment performs an operation by a full adder, which is frequently used when an operation is performed using TFHE that is fully homomorphic encryption as described above, at faster speed.

As described above, a full adder is generally configured by two half adders and an OR circuit unit performing an operation for obtaining OR, and the half adder is configured by a pair of an AND circuit unit performing an operation for obtaining AND an XOR circuit unit performing an operation for obtaining XOR. Therefore, the full adder can be sped up by speeding up the half adder.

In the present embodiment, operations configuring the half adder (the operation for obtaining AND the operation obtaining XOR) are integrated into one, whereby the number of times of homomorphic operations configuring the half adder is reduced, and the number of times of homomorphic operations configuring the full adder is eventually reduced.

A process by a half adder configuring a full adder of the present embodiment is described in detail with reference to FIGS. 2 to 4.

FIG. 3 is a diagram illustrating a half adder corresponding to the half adder 51 in FIG. 1.

FIG. 4 is a diagram illustrating a half adder corresponding to the half adder 52 in FIG. 1.

TLWE ciphertexts ca, cb, and cc respectively corresponding to plaintexts A, B, and C are input to a full adder configured to include the half adders illustrated in FIGS. 3 and 4.

As described above, the TLWE ciphertexts ca, cb, and cc are encrypted by additive homomorphic encryption, and a sum of the plaintexts can be calculated by calculating a sum of the ciphertexts.

These ciphertexts are ciphertexts created by general Gate Bootstrapping or are newly encrypted.

It is assumed that the plaintexts A, B, and C of the TLWE ciphertexts ca, cb, and cc are either 0 or ¼ on the circle group {T} in FIG. 5, for example, and an error added to each plaintext is included in ±1⁄16.

The configuration of the half adder 51 is described with reference to FIG. 3.

The TLWE ciphertexts ca and cb respectively corresponding to inputs A and B of the full adder are input to the half adder 51.

The encryption processing device 1 (the first operation unit 12) calculates ca+cb−(0, ⅛). (0, ⅛) is a trivial TLWE ciphertext of which a plaintext is ⅛.

When ca is 0 and cb is 0»0+0−⅛=−⅛=⅞

When ca is 0 and cb is ¼»0+¼−⅛=⅛

When ca is ¼ and cb is 0»¼+0−⅛=⅛

When ca is ¼ and cb is ¼»¼+¼−⅛=⅜

From the above results, the operation result becomes any of ⅛, ⅜, and ⅞, and a ciphertext of any of these three plaintexts is obtained. An error added to the plaintext is included in a range of ±⅛. This is because two errors, i.e., an error of the ciphertext ca and an error of the ciphertext cb each of which is ±1⁄16 are added together.

The encryption processing device 1 (the first Bootstrapping unit 15) performs Gate Bootstrapping in the above paper for the result of the above calculation ca+cb−(0, ⅛) up to SampleExtract (at the 0 position).

That is, the encryption processing device 1 (the first Bootstrapping unit 15) performs SampleExtract for the TRLWE ciphertext obtained by performing BlindRotate for the result of the calculation ca+cb−(0, ⅛), at the 0 position on the circle group {T}.

As a result, the encryption processing device 1 (the first Bootstrapping unit 15) obtains the following TLWE ciphertext cy1 (encrypted with [s']).

The result of SampleExtract at the 0 position is as follows.

When ca is 0 and cb is 0»0

When ca is 0 and cb is ¼»0

When ca is ¼ and cb is 0»0

When ca is ¼ and cb is ¼»¼

The TLWE ciphertext cy1 thus obtained has 0 or ¼ as a plaintext, and an error added to the plaintext falls within a range narrower than the range of ±1⁄16 by several orders of magnitudes.

The result of the above homomorphic operation, BlindRotate, and SampleExtract(0) (the TLWE ciphertext cy1) is represented by a binary symbol as follows.

When ca is 0 and cb is 0»0

When ca is 0 and cb is 1»0

When ca is 1 and cb is 0»0

When ca is 1 and cb is 1»1

Obtaining the TLWE ciphertext cy1 in this manner is synonymous with calculating AND of the ciphertext ca and the ciphertext cb. The obtained ciphertext cy1 is a carry output of the half adder 51 and is input to the OR circuit unit in the subsequent stage.

The encryption processing device 1 (the second Bootstrapping unit 16) performs SampleExtract at the n/2 position for the TRLWE ciphertext obtained by performing BlindRotate for ca+cb−(0, ⅛) described above. In more detail, the encryption processing device 1 performs SampleExtract at the n/2 position for the TRLWE ciphertext obtained by performing BlindRotate for the result of calculation ca+cb−(0, ⅛).

SampleExtract at the n/2 position is performed as follows.

In the process of SampleExtract, $$\varphi_{s'}(c) = \sum_{j=0}^{n-1} \left(b_{j+1} - \sum_{i=0}^{n-1} a'_{i+j-n+2} s'_{n-i}\right) X^j$$

appears from a plaintext polynomial decrypted from a TRLWE ciphertext as described above. The coefficient of each term of the plaintext polynomial can be obtained from this equation, as also described above. To perform SampleExtract at the n/2 position is to extract the term of the n/2 power of $\varphi_s$'(c), and is to extract only the coefficient of j=n/2.

[a] and b are determined so that $$\varphi_{s'}(c'') = b_{n/2+1} - \sum_{i=0}^{n-1} a'_{i-n/2+2} s'_{n-i}$$

is obtained as the decryption result of the TLWE ciphertext c" obtained by performing SampleExtract at the n/2 position for the TRLWE ciphertext c. For this purpose, it suffices that the subscript of a' is converted to h{i−(n/2)+2}=n−i, and h(x)=−x+n/2+2.

Therefore, when $$a''_i = \begin{cases} a_{-i+\frac{n}{2}+2} & \text{if } i < \frac{n}{2}+2 \\ a_{-i+\frac{3n}{2}+2} & \text{if } i \geq \frac{n}{2}+2 \end{cases}$$

$$b'' = b_{\frac{n}{2}+1}$$

the TRLWE ciphertext c"=(a"$_i$, b") is obtained as the result of SampleExtract at the n/2 position.

By the above-described processes, the encryption processing device 1 (the second Bootstrapping unit 16) can obtain a TLWE ciphertext ct1 (the TLWE ciphertext c") as the result of SampleExtract performed at the n/2 position for the TRLWE ciphertext obtained by performing BlindRotate for the above calculation ca+cb−(0, ⅛).

The result of SampleExtract at the n/2 position is as follows.

When ca is 0 and cb is 0»0

When ca is 0 and cb is ¼»¼

When ca is ¼ and cb is 0»¼

When ca is ¼ and cb is ¼»¼

The TLWE ciphertext ct1 thus obtained has 0 or ¼ as a plaintext, and an error added to the plaintext falls within a range narrower than the range of ±1⁄16 by several orders of magnitudes.

The result of the above homomorphic operation, BlindRotate, and SampleExtract(n/2) (the TLWE ciphertext ct1) is represented by a binary symbol as follows.

When ca is 0 and cb is 0»0

When ca is 0 and cb is 1»1

When ca is 1 and cb is 0»1

When ca is 1 and cb is 1»1

Obtaining the TLWE ciphertext ct1 in this manner is synonymous with calculating OR of the ciphertext ca and the ciphertext cb.

It has been described that AND and OR can be obtained by performing SampleExtract for the result of BlindRotate at a plurality of different positions (0, n/2) on the circle group {T}. This fact is based on that, in TFHE, AND and OR of ciphertexts appear as phase differences on the circle group {T}.

Next, the encryption processing device 1 subtracts the above AND result (the TLWE ciphertext cy1) from the above OR result (the ciphertext ct1) in a homomorphic manner, thereby obtaining the ciphertext cz1.

The calculation result is as follows.

When ca is 0 and cb is 0: 0−0=0

When ca is 0 and cb is ¼: ¼−0=¼

When ca is ¼ and cb is 0: ¼−0=¼

When ca is ¼ and cb is ¼: ¼−¼=0

The TLWE ciphertext cz1 has 0 or ¼ as a plaintext, and an error added to the plaintext falls within a range narrower than the range of ±1⁄16 by several orders of magnitudes.

The result of the above homomorphic operation (the homomorphic subtraction) is represented by a binary symbol as follows.

When ca is 0 and cb is 0»0

When ca is 0 and cb is 1»1

When ca is 1 and cb is 0»1

When ca is 1 and cb is 1»0

Obtaining the TLWE ciphertext cz1 in this manner is synonymous with calculating XOR of the ciphertext ca and the ciphertext cb.

The obtained TLWE ciphertext cz1 is a sum as the output of the half adder 51.

It is described in https://eprint.iacr.org/2018/637.pdf that the XOR result can be obtained by subtracting the AND result from the OR result.

Finally, the encryption processing device 1 performs key switching for each of the ciphertext cy1 and the ciphertext cz1. The ciphertexts obtained by this key switching are ciphertexts using the same parameters as those in the original TLWE ciphertexts ca and cb, and can be used again in another operation.

At this time, errors of both the ciphertexts fall within a range of ±1⁄16. This is because a large part of the error added in Gate Bootstrapping is generated by key switching, and an error of a TLWE ciphertext before SampleExtract is smaller than the error provided by key switching by several orders of magnitude.

The half adder 52 illustrated in FIG. 4 has the same configuration as the half adder 51 in FIG. 3.

The TLWE ciphertext cz1 from the half adder 51 and a ciphertext cc of a carry input Ci are input to the half adder 52.

The encryption processing device 1 calculates cz1+cc−(0, ⅛). (0, ⅛) is a trivial TLWE ciphertext of which a plaintext is ⅛.

When cz1 is 0 and cc is 0»0+0−⅛=−⅛=⅞

When cz1 is 0 and cc is ¼»0+¼−⅛=⅛

When cz1 is ¼ and cc is 0»¼+0−⅛=⅛

When cz1 is ¼ and cc is ¼»¼+¼−⅛=⅜

The operation result becomes any of ⅛, ⅜, and ⅞, and a ciphertext of any of these three plaintexts is obtained.

An error added to the plaintext is included in a range of ±⅛. This is because two errors, i.e., the error of cz1 and the error of cc each of which is ±1⁄16 are added together.

The encryption processing device 1 performs Gate Bootstrapping in the above paper for the result of the above calculation cz1+cc−(0, ⅛) up to SampleExtract (at the 0 position). That is, the encryption processing device 1 performs SampleExtract for the TRLWE ciphertext obtained by performing BlindRotate for the result of the calculation cz1+cc−(0, ⅛), at the 0 position on the circle group {T}.

As a result, the encryption processing device 1 obtains the following TLWE ciphertext cy (encrypted with [s']).

The result of SampleExtract at the 0 position is as follows.

When cz1 is 0 and cc is 0»0
When cz1 is 0 and cc is ¼»0
When cz1 is ¼ and cc is 0»0
When cz1 is ¼ and cc is ¼»¼

The TLWE ciphertext cy thus obtained has 0 or ¼ as a plaintext, and an error added to the plaintext falls within a range narrower than the range of ±1/16 by several orders of magnitudes.

The result of the above homomorphic operation, BlindRotate, and SampleExtract(0) (the TLWE ciphertext cy) is represented by a binary symbol as follows.

When cz1 is 0 and cc is 0»0
When cz1 is 0 and cc is 1»0
When cz1 is 1 and cc is 0»0
When cz1 is 1 and cc is 1»1

Obtaining the TLWE ciphertext cy in this manner is synonymous with calculating AND of the ciphertext cz1 and the ciphertext cc. The obtained TLWE ciphertext cy is output as a carry output Co.

Further, the encryption processing device 1 performs SampleExtract at the n/2 position for the TRLWE ciphertext obtained by performing BlindRotate for cz1+cc−(0, ⅛). In more detail, the encryption processing device 1 performs SampleExtract for the TRLWE ciphertext obtained by performing BlindRotate for the result of calculation cz1+cc−(0, ⅛), at the n/2 position on the circle group {T}.

The process of performing SampleExtract at the n/2 position is described above.

As a result of performing SampleExtract at the n/2 position for the TRLWE ciphertext obtained by performing BlindRotate for cz1+cc−(0, ⅛), the encryption processing device 1 obtains the TLWE ciphertext ct2 (the TLWE ciphertext c").

The result of SampleExtract at the n/2 position is as follows.

When cz1 is 0 and cc is 0»0
When cz1 is 0 and cc is ¼»¼
When cz1 is ¼ and cc is 0»¼
When cz1 is ¼ and cc is ¼»¼

The TLWE ciphertext ct2 thus obtained has 0 or ¼ as a plaintext, and an error added to the plaintext falls within a range narrower than the range of ±1/16 by several orders of magnitudes.

The result of the above homomorphic operation, BlindRotate, and SampleExtract(n/2) (the TLWE ciphertext ct2) is represented by a binary symbol as follows.

When cz1 is 0 and cc is 0»0
When cz1 is 0 and cc is 1»1
When cz1 is 1 and cc is 0»1
When cz1 is 1 and cc is 1»1

Obtaining the TLWE ciphertext ct2 in this manner is synonymous with calculating OR of the ciphertext cz1 and the ciphertext cc.

Next, the encryption processing device 1 performs a homomorphic subtraction (OR-AND) for the OR result and the AND result described above, thereby obtaining the ciphertext cz.

The calculation result is as follows.

When cz1 is 0 and cc is 0: 0−0=0
When cz1 is 0 and cc is ¼: ¼−0=¼
When cz1 is ¼ and cc is 0: ¼−0=¼
When cz1 is ¼ and cc is ¼: ¼−¼=0

The TLWE ciphertext cz thus obtained has 0 or ¼ as a plaintext, and an error added to the plaintext falls within a range narrower than the range of ±1/16 by several orders of magnitudes.

The result of the above homomorphic operation (the homomorphic subtraction) is represented by a binary symbol as follows.

When cz1 is 0 and cc is 0»0
When cz1 is 0 and cc is 1»1
When cz1 is 1 and cc is 0»1
When cz1 is 1 and cc is 1»0

Obtaining the TLWE ciphertext cz in this manner is synonymous with calculating XOR of the ciphertext cz1 and the ciphertext cc. The obtained TLWE ciphertext cz is the output of the full adder 51.

As a result of experiments, it has been found that the processing by each of the half adders 51 and 52 having the configurations illustrated in FIGS. 3 and 4 requires 12.9 ms.

The time required for one normal logical operation (a homomorphic operation+Gate Bootstrapping) is 11.5 ms, and a half adder performing two logical operations illustrated in FIG. 1 requires 23 ms. In the method of the present embodiment, a result was obtained in which the speed was approximately double that of the conventional method. The reason why the processing time is different from that in the above paper is considered to be a difference depending on the experimental environment.

The encryption processing device 1 of the present embodiment performs SampleExtract at two different positions after performing BlindRotate once in each of half adders configuring a full adder, thereby performing a process corresponding to an AND operation or an OR operation, and then performs a subtraction of the result of the AND operation from the result of the OR operation (a homomorphic operation), thereby performing an XOR operation.

As described in the above paper, increase in an error by a homomorphic addition of TLWE ciphertexts in a stage after SampleExtract before key switching is at a negligible level. An error added by BlindRotate and an error added by key switching are different from each other by about an order of magnitude depending on parameters. In the experimental results, the variance of an error in normal Gate Bootstrapping is $1.355\times10^{-5}$, and the variance of an error in the method of the present embodiment is $1.942\times10^{-5}$.

When a full adder is configured by adopting the method of the present embodiment, an increase in speed of about 40% is expected in the present embodiment that performs BlindRotate once in each half adder (twice in the full adder), as compared with the method of FIG. 1 that performs BlindRotate five times.

In the experimental results, 59.2 ms was required in the five-gate configuration in FIGS. 1, and 37.6 ms was required in the configuration of the present embodiment. Thus, an increase in speed of about 36.5% was confirmed.

The difference from the theoretical value (40%) is considered to be due to increase in the number of times of each of SampleExtract and key switching by one.

Figure 7:
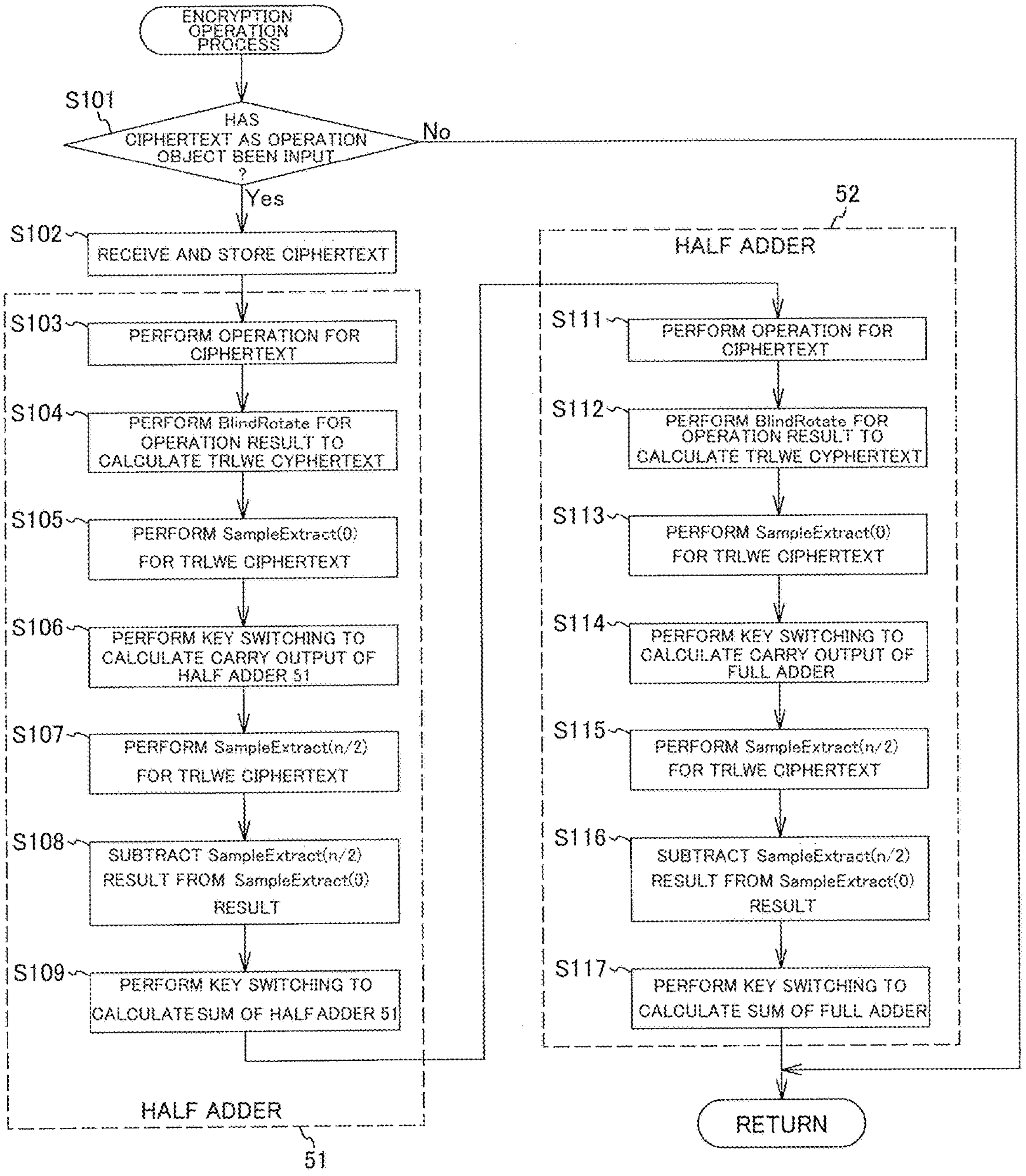
FIG. 7 is a flowchart for explaining a processing flow of an operation by the full adder performed by an encryption processing device.

FIG. 7 is a flowchart for explaining a processing flow of an operation by a full adder performed by an encryption processing device.

As described above, in a case of a binary ciphertext, a plaintext in a section from 0 to ¼ or from ¾ to 1 on the circle group {T} is converted to a TLWE ciphertext 0. Further, a plaintext in a section from ¼ to ¾ on the circle group {T} is converted to a TLWE ciphertext ¼. An error added to the plaintext in this conversion is any value within a range of ±1/16.

Symbols used in a logical operation, for example, 0 and 1 are associated with the aforementioned ranges on the circle group {T}.

That is,

| Symbol | Range on circle group {T} |
|---|---|
| 0 | $0 \pm 1/16$ |
| 1 | $1/4 \pm 1/16$ |

are established.

The range (including the error) on the circle group {T} is associated with a value of any plaintext of a ciphertext.

A ciphertext is a vector in the form of ([a], b), and a vector element is a point on a circle group. A plaintext is also a point on the circle group {T}.

A symbol used in a logical operation is associated with a range on the circle group {T}, and a plaintext for a certain ciphertext indicates a point within the range. It is difficult to identify which point in the range is indicated by the plaintext without a private key. The strength of TLWE ciphertexts is thus ensured. When the range is assumed as 0 and points on the circle group and symbols are associated with each other, a plaintext can be derived as a simultaneous equation by collecting a plurality of ciphertexts, so that the TLWE ciphertexts do not function as encryption.

At Step S101, the encryption processing device 1 (the receiving unit 11) determines whether a ciphertext that is an object of an operation has been input.

When it is determined that the ciphertext has been input (Yes at Step S101), the encryption processing device 1 (the receiving unit 11) receives the ciphertext and stores it in the storage unit 20 at Step S102.

Next, at Step S103, the encryption processing device 1 (the first operation unit 12) performs a homomorphic operation using the ciphertext and stores an operation result in the storage unit 20.

When receiving the two ciphertexts ca and cb each of which can have either one of two values as a plaintext, the first operation unit 12 performs a homomorphic operation of $ca+cb-1/8$.

At Step S104, the encryption processing device 1 (the first Bootstrapping unit 15) performs BlindRotate in Gate Bootstrapping for the operation result and stores a TRLWE ciphertext as the process result in the storage unit 20.

At Step S105, the encryption processing device 1 (the first Bootstrapping unit 15) performs SampleExtract(0) in Gate Bootstrapping for the TRLWE ciphertext obtained by BlindRotate and stores the process result in the storage unit 20.

At Step S106, the encryption processing device 1 (the first Bootstrapping unit 15) performs key switching for the result of the process of SampleExtract(0) and stores the ciphertext cy1 as a carry output of the half adder 51 that can have either one of two values as a plaintext in the storage unit 20 as the process result.

At Step S107, the encryption processing device 1 (the second Bootstrapping unit 16) performs SampleExtract(n/2) in Gate Bootstrapping for the TRLWE ciphertext obtained by BlindRotate by the first operation unit 12 and stores the process result (the ciphertext ct1) in the storage unit 20.

At Step S108, the encryption processing device 1 (the second operation unit 12) performs a homomorphic operation (subtraction) for the result of the process of SampleExtract(0) (the ciphertext cy1) and the result of the process of SampleExtract(n/2) (the ciphertext ct1) and stores the operation result (the ciphertext cz1) in the storage unit 20.

At Step S109, the encryption processing device 1 (the second Bootstrapping unit 16) performs key switching for the operation result and stores the ciphertext cz1 as the sum of the half adder 51, which can have either one of two values as a plaintext, in the storage unit 20 as the process result.

SampleExtract at Step S105 and SampleExtract at Step S107 can be performed in parallel by multithread processing.

Next, at Step S111, the encryption processing device 1 (the first operation unit 12) performs a homomorphic operation using the ciphertext and stores an operation result in the storage unit 20.

When receiving the two ciphertexts cz1 and cc each of which can have either one of two values as a plaintext, the first operation unit 12 performs a homomorphic operation of $cz1+cc-1/8$.

At Step S112, the encryption processing device 1 (the first Bootstrapping unit 15) performs BlindRotate in Gate Bootstrapping for the operation result and stores a TRLWE ciphertext as the process result in the storage unit 20.

At Step S113, the encryption processing device 1 (the first Bootstrapping unit 15) performs SampleExtract(0) in Gate Bootstrapping for the TRLWE ciphertext obtained by BlindRotate and stores the process result in the storage unit 20.

At Step S114, the encryption processing device 1 (the first Bootstrapping unit 15) performs key switching for the result of the process of SampleExtract(0) and stores the ciphertext cy as a carry output of the half adder 52, which can have either one of two values as a plaintext, in the storage unit 20 as the process result.

At Step S115, the encryption processing device 1 (the second Bootstrapping unit 16) performs SampleExtract(n/2) in Gate Bootstrapping for the TRLWE ciphertext obtained by BlindRotate by the second operation unit 13 and stores the process result (the ciphertext ct2) in the storage unit 20.

At Step S116, the encryption processing device 1 (the second operation unit 13) performs a homomorphic operation (subtraction) for the result of the process of SampleExtract(0) (the ciphertext cy) and the result of the process of SampleExtract(n/2) (the ciphertext ct2) and stores the operation result (the ciphertext cz) in the storage unit 20.

At Step S117, the encryption processing device 1 (the second Bootstrapping unit 16) performs key switching for the operation result and stores the ciphertext cz as the sum of the full adder, which can have either one of two values as a plaintext, in the storage unit 20 as the process result.

SampleExtract at Step S113 and SampleExtract at Step S115 can be performed in parallel by multithread processing.

Application Example

The speed increase of a full adder achieved by the encryption processing device 1 can be applied as follows.

For example, there is considered a case in which it is desired to aggregate, from a database in which fields and/or records are encrypted by TLWE encryption, records each having a specific field within a certain range (for example, a case in which it is desired to obtain an average annual income of 30 to 39 years old).

In this case, the encryption processing device 1 is a database sever that manages the encrypted database, receives a query encrypted by TLWE encryption from a terminal device connected thereto via a network or the like, and returns a response to the query which is encrypted by TLWE encryption to the terminal device.

Since an index cannot be created in the encrypted database, it is necessary to perform comparison and aggregation for the entire database.

The encryption processing device 1 performs a comparison operation that compares all the records of the encrypted database with the query by functions of the first operation unit 12, the second operation unit 13, the first Bootstrapping unit 15, and the second Bootstrapping unit 16 that implement a full adder.

The comparison operation is to perform subtraction between a ciphertext of a record and a ciphertext of a query, and the sign of the subtraction result is equivalent to the comparison operation.

The encryption processing device 1 can further perform an aggregate operation for records that match the query in the comparison operation.

In the aggregate operation, the encryption processing device 1 adds the records that average value by using division.

As described above, in processing of a query with respect to an encrypted database, it is necessary to perform four arithmetic operations such as addition, subtraction, multiplication, and division, and comparison (comparison is equivalent to positive or negative of a subtraction result) between integers constituting ciphertexts. In addition, it is considered that a full adder operation is frequently used for the processing. If the bit length of an integer to be handled becomes large, the number of required full adders also increases.

With speed increase of an operation by the full adder by reduction of the number of times of the above-described logical operation and reduction of the number of times of Gate Bootstrapping (BlindRotate), the time for query execution time can be significantly reduced.

The four arithmetic operations are homomorphic four arithmetic operations with respect to encrypted numerical values that are regarded as ciphertexts of respective bits when a permutation using an input ciphertext is expressed in binary.

The four arithmetic operations and comparison between integers are used not only for aggregation in the database described above, but also in various data processing using ciphertexts frequently.

Other examples include fuzzy authentication and fuzzy search.

Fuzzy authentication is biometric authentication using, for example, biometric authentication data, and it is an absolute condition that biometric authentication data that does not change over a lifetime is encrypted and concealed.

In fuzzy authentication, authentication is performed based on a correspondence between biometric authentication data presented as an authentication request and biometric authentication data registered in a database. It is determined whether both the data match each other with a threshold, instead of determining whether both the data completely match each other.

Fuzzy search is an ambiguous search method in which data close to a query is presented as a search result from a database even if the query and a record do not completely match.

In fuzzy authentication and fuzzy search, the encrypted database and the query are compared with each other, as in the comparison operation and the aggregate operation in the encrypted database described above. At this time, it is necessary to perform the comparison operation using the data encrypted by homomorphic encryption.

In particular, in fuzzy authentication and fuzzy search, addition, subtraction, multiplication, division, and comparison between integers occupy most of the processing time, and therefore a significant effect can be obtained in shortening the processing time by speeding up an operation by a full adder used for these operations.

In addition, the Euclidean distance is often used for comparison in fuzzy authentication and fuzzy search. When the Euclidean distance is calculated, calculation of a square is required. Therefore, in Bit-wise type homomorphic encryption, $O(N^2)$ full adders must be caused to operate with respect to the bit length of data when multiplication is performed. Even in a comparison operation by simple subtraction, it is necessary to operate $O(N)$ full adders. Therefore, by speeding up an operation by a full adder, the processing time required for fuzzy authentication or fuzzy search can be largely reduced.

Figure 8:
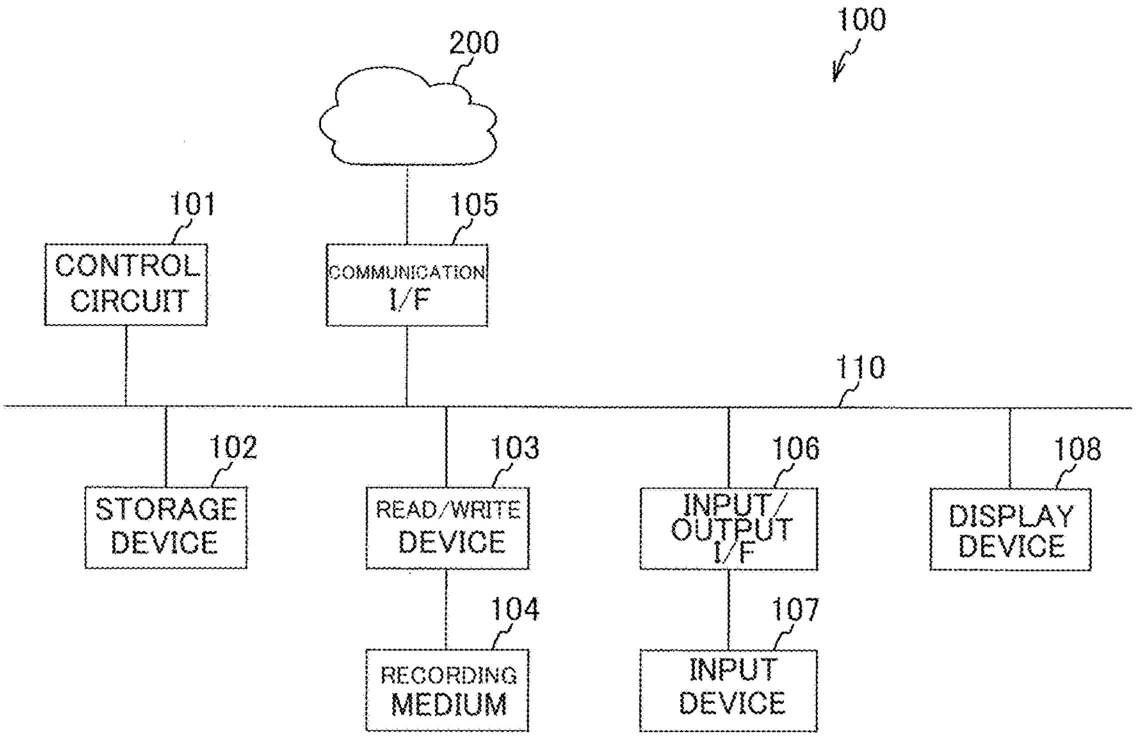
FIG. 8 is a block diagram illustrating an example of a computer device.

FIG. 8 is a block diagram illustrating an example of a computer device.

The configuration of a computer device 100 is described with reference to FIG. 8.

The computer device 100 is, for example, an encryption processing device that processes various types of information. The computer device 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing device 1 can be configured by a part or all elements which are selected from the constituent elements described in the computer device 100 as appropriate.

The control circuit 101 controls the entire computer device 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIG. 2, for example.

The storage device 102 stores various types of data therein. For example, the storage device 102 is a memory such as a Read Only Memory (ROM) and a Random Access Memory (RAM), a Hard Disk Drive (HDD), and a Solid State Drive (SSD). The storage device 102 may store therein an information processing program that causes the control circuit 101 to function as the controller 10 in FIG. 2. The storage device 102 functions as the storage unit 20 in FIG. 2, for example.

The encryption processing device 1 loads a program stored in the storage device 102 into a RAM when performing information processing.

The encryption processing device 1 executes the program loaded to the RAM by the control circuit 101, thereby performing processing that includes at least one of a receiving process, a first operation process, a second operation process, a first Bootstrapping process, a second Bootstrapping process, and an output process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores various types of data therein. The recording medium 104 stores information processing program therein, for example. For example, the recording medium 104 is a non-volatile memory (non-transitory computer-readable recording medium) such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 connects the computer device 100 and another device to each other via the network 200 in a communicable manner. The communication interface 105 functions as the communication unit 25 in FIG. 2, for example.

The input/output interface 106 is, for example, an interface that can be connected to various types of input devices in a removable manner. Examples of the input device 107 connected to the input/output interface 106 include a keyboard and a mouse. The input/output interface 106 connects each of the various types of input devices connected thereto and the computer device 100 to each other in a communicable manner. The input/output interface 106 outputs a signal input from each of the various types of input devices connected thereto to the control circuit 101 via the bus 110. The input/output interface 106 also outputs a signal output from the control circuit 101 to an input/output device via the bus 110. The input/output interface 106 functions as the input unit 26 in FIG. 2, for example.

The display device 108 displays various types of information. The network 200 is, for example, a LAN, wireless communication, a P2P network, or the Internet and communicably connects the computer device 100 to other devices.

The present embodiment is not limited to the embodiment described above and various configurations or embodiments can be applied within a scope not departing from the gist of the present embodiment.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

The invention claimed is:

1. An encryption processing device processing a ciphertext, the ciphertext having as a plaintext either one of two values each obtained by adding an error with a predetermined variance to a predetermined value corresponding to a symbol 0 or 1 and being a fully homomorphic ciphertext able to be subjected to a logical operation without being decrypted, the encryption processing device executing a predetermined operation including calculating a plurality of new ciphertexts based on the ciphertexts input thereto, wherein the encryption processing device comprises a processor which executes a process and a storage device, the process including:

performing a first homomorphic operation for the input ciphertext, calculating a first ciphertext having a second polynomial as a plaintext by rotating coefficients of a first polynomial based on a result of the first homomorphic operation to extract a second ciphertext having a coefficient of the second polynomial as a plaintext and storing the second ciphertext in the storage device, extracting a third ciphertext having another coefficient of the second polynomial as a plaintext and storing the third ciphertext in the storage device, and performing a homomorphic operation using the second ciphertext and the third ciphertext to calculate a fourth ciphertext and storing the fourth ciphertext in the storage device.

2. The encryption processing device according to claim 1, wherein the predetermined operation is an operation by a half adder, wherein the second ciphertext is a ciphertext corresponding to a carry output of the half adder, and the fourth ciphertext is a ciphertext corresponding to a sum output of the half adder.

3. The encryption processing device according to claim 2, wherein the process executed by the processor includes performing homomorphic four arithmetic operations with respect to encrypted numerical values that are regarded as ciphertexts of respective bits when a permutation using the input ciphertext is expressed in binary, by performing the operation by the half adder as the predetermined operation.

4. The encryption processing device according to claim 2, wherein the process executed by the processor includes performing a process related to fuzzy authentication or fuzzy search using the input ciphertext by performing an operation by a full adder using the half adder as the predetermined operation.

5. The encryption processing device according to claim 2, wherein the process executed by the processor includes processing a query to an encrypted database based on the input ciphertext by performing an operation by a full adder using the half adder as the predetermined operation.

6. A non-transitory computer-readable recording medium storing therein a program for causing a processor to execute an encryption processing process to process a ciphertext, the ciphertext having as a plaintext either one of two values each obtained by adding an error with a predetermined variance to a predetermined value corresponding to a symbol 0 or 1 and being a fully homomorphic ciphertext able to be subjected to a logical operation without being decrypted, the processor executing a predetermined operation including calculating a plurality of new ciphertexts based on the ciphertexts that are input, wherein the encryption processing process comprises:

performing a first homomorphic operation for the input ciphertext, calculating a first ciphertext having a polynomial by using a predetermined polynomial for a result of the first homomorphic operation to extract a second ciphertext having a coefficient of a plaintext polynomial of the first ciphertext, extracting a third ciphertext having another coefficient of a plaintext polynomial of the first ciphertext, and performing a homomorphic operation using the second ciphertext and the third ciphertext to calculate a fourth ciphertext.

7. An encryption processing device, the device comprising a processor which executes a process including and a storage device, the process including:

performing addition without decrypting using a first ciphertext with an error corresponding to a plaintext having two values and a second ciphertext with an error corresponding to a plaintext having two values, obtaining a third ciphertext of a second polynomial obtained by rotating coefficients of a second polynomial in accordance with a result of the addition without decrypting, to extract from the third ciphertext, a fourth ciphertext of the second polynomial from which a result of a OR operation for a plaintext corresponding to the first ciphertext and a plaintext corresponding to the second ciphertext is obtained, and storing the fourth ciphertext in the storage device, extracting from the third ciphertext, a fifth ciphertext of a coefficient of the second polynomial from which a result of a OR operation for a plaintext corresponding to the first ciphertext and a plaintext corresponding to the second ciphertext is obtained, and storing the fifth ciphertext in the storage device, and calculating a sixth ciphertext corresponding to a result of a XOR operation for a plaintext corresponding to the first ciphertext and a plaintext corresponding to the second ciphertext, using the fourth ciphertext and the fifth ciphertext, and storing the sixth ciphertext in the storage device.

* * * * *